United States Patent
Kon et al.

(10) Patent No.: US 12,287,701 B2
(45) Date of Patent: Apr. 29, 2025

(54) DATA RECORDER AND METHOD FOR USING DATA RECORDER

(71) Applicant: Mitsubishi Electric Corporation, Tokyo (JP)

(72) Inventors: Yoshihisa Kon, Tokyo (JP); Toru Sasaki, Tokyo (JP); Minoru Yoshida, Tokyo (JP); Kazuki Oya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 232 days.

(21) Appl. No.: 18/014,754

(22) PCT Filed: Aug. 6, 2020

(86) PCT No.: PCT/JP2020/030134
§ 371 (c)(1),
(2) Date: Jan. 6, 2023

(87) PCT Pub. No.: WO2022/029952
PCT Pub. Date: Feb. 10, 2022

(65) Prior Publication Data
US 2023/0289257 A1 Sep. 14, 2023

(51) Int. Cl.
*G06F 11/07* (2006.01)
(52) U.S. Cl.
CPC ........ *G06F 11/0793* (2013.01); *G06F 11/073* (2013.01)
(58) Field of Classification Search
CPC ............... G06F 11/0793; G06F 11/073; G06F 2212/1028; G06F 2212/7203; G06F 12/0246
See application file for complete search history.

(56) References Cited

U.S. PATENT DOCUMENTS

2009/0031150 A1 1/2009 Koga
2011/0246711 A1 10/2011 Koga
(Continued)

FOREIGN PATENT DOCUMENTS

JP 2009-26271 A 2/2009
JP 2018-136735 A 8/2018

OTHER PUBLICATIONS

International Search Report and Written Opinion mailed on Nov. 10, 2020, received for PCT Application PCT/JP2020/030134, filed on Aug. 6, 2020, 9 pages including English Translation.
(Continued)

*Primary Examiner* — Matthew M Kim
*Assistant Examiner* — Matthew N Putaraksa
(74) *Attorney, Agent, or Firm* — XSENSUS LLP

(57) ABSTRACT

A data recorder capable of reducing adverse effects caused by radiation is provided. In one aspect of a data recorder of the present disclosure, an input interface includes a first buffer memory, the input interface accepts input of data from outside and records the data in the first buffer memory, a control unit switches a state of a power supply for non-volatile memory to an on state at a timing determined on the basis of an amount of data recorded in the first buffer memory and a mode of the input of the data from the outside via the input interface, the input interface transfers the data recorded in the first buffer memory to the non-volatile memory in a case where the power supply for non-volatile memory is in an on state.

39 Claims, 17 Drawing Sheets

(56) References Cited

U.S. PATENT DOCUMENTS

2016/0103478 A1* 4/2016 Nakanishi .............. G11C 5/148
                                                    713/323
2017/0329539 A1* 11/2017 Ko ...................... G06F 12/0246
2020/0089604 A1* 3/2020 Takeuchi .............. G06F 3/0625
2021/0224158 A1* 7/2021 Liu ..................... G06F 11/0793
2024/0193080 A1* 6/2024 Moriyasu ............ G06F 12/0246

OTHER PUBLICATIONS

Office Action issued Jul. 25, 2023 in Japanese Patent Application No. 2022-541038 and computer-generated English translation thereof, 9 pages.

* cited by examiner

F I G. 1 5
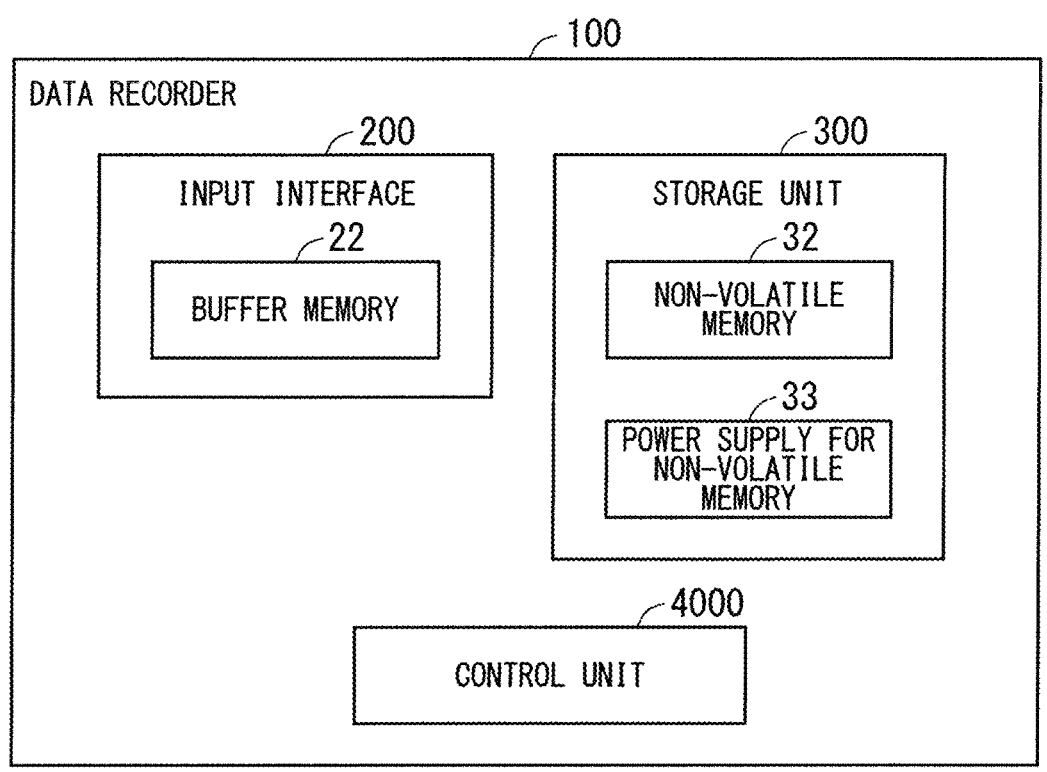

DATA RECORDER AND METHOD FOR USING DATA RECORDER

CROSS-REFERENCE TO RELATED APPLICATION

The present application is based on PCT filing PCT/JP2020/030134, filed Aug. 6, 2020, the entire contents of which are incorporated herein by reference.

TECHNICAL FIELD

The present disclosure relates to a data recorder and a method for using the data recorder.

BACKGROUND ART

It is known that particles having high energy called radiation adversely affect electronic devices. Radiation is flying in space, and radiation from space or radiation emitted from radioactive substances is also present on the ground.

PRIOR ART DOCUMENT

Patent Document

Patent Document 1: Japanese Patent Application Laid-Open No. 2009-026271

SUMMARY

Problem to be Solved by the Invention

By powering off an electronic device or part of the electronic device, it is possible to reduce adverse effects of radiation on the electronic device or the part of the electronic device.

Patent Document 1 discloses a configuration for controlling a power supply of a non-volatile memory module of a data recorder in order to achieve power saving in the data recorder. However, control of the power supply disclosed in Patent Document 1 has room for improvement from a viewpoint of countermeasures against adverse effects of radiation.

The present disclosure is intended to solve such a problem, and an object of the present disclosure is to provide a data recorder capable of reducing adverse effects caused by radiation and to provide a method for using the data recorder capable of reducing adverse effects caused by radiation.

Means to Solve the Problem

A data recorder according to one aspect of the present disclosure includes an input interface, a storage unit, and a control unit, in which the storage unit includes a non-volatile memory configured to store data and a power supply for non-volatile memory that is a power supply for the non-volatile memory, a state of the power supply for non-volatile memory being controlled to be an on state or an off state by the control unit, the input interface includes a first buffer memory, the input interface accepts input of data from outside and records the data in the first buffer memory, the control unit switches a state of the power supply for non-volatile memory to an on state at a timing determined on the basis of an amount of data recorded in the first buffer memory and a mode of the input of the data from the outside via the input interface, the input interface transfers the data recorded in the first buffer memory to the non-volatile memory in a case where the power supply for non-volatile memory is in an on state, and the control unit switches the state of the power supply for non-volatile memory to an off state after transferring the data recorded in the first buffer memory to the non-volatile memory.

In addition, a data recorder according to another aspect of the present disclosure is a data recorder including an output interface, a storage unit, and a control unit, in which the storage unit includes a non-volatile memory configured to store data and a power supply for non-volatile memory that is a power supply for the non-volatile memory, a state of the power supply for non-volatile memory being controlled to be an on state or an off state by the control unit, the output interface includes a second buffer memory, and, when data to be output, stored in the non-volatile memory is output to outside via the second buffer memory, the control unit switches a state of the power supply for non-volatile memory to an off state in part of a period from start of transfer of the data to be output to the second buffer memory to end of transfer of the data to be output to the second buffer memory.

Further, a data recorder according to still another aspect of the present disclosure includes an input interface, an output interface, a storage unit, and a control unit, in which the storage unit includes a non-volatile memory configured to store data and a power supply for non-volatile memory that is a power supply for the non-volatile memory, a state of the power supply for non-volatile memory being controlled to be an on state or an off state by the control unit, the input interface includes a first buffer memory, the output interface includes a second buffer memory, the input interface accepts input of data from outside and records the data in the first buffer memory, the control unit switches a state of the power supply for non-volatile memory to an on state at a timing determined on the basis of an amount of data recorded in the first buffer memory and a mode of the input of the data from the outside via the input interface, the input interface transfers data recorded in the first buffer memory to the non-volatile memory in a case where the power supply for non-volatile memory is in an on state, the control unit switches the state of the power supply for non-volatile memory to an off state after transferring the data recorded in the first buffer memory to the non-volatile memory, and, when data to be output, stored in the non-volatile memory is output to outside via the second buffer memory, the control unit switches the state of the power supply for non-volatile memory to an off state in part of a period from start of transfer of the data to be output to the second buffer memory to end of transfer of the data to be output to the second buffer memory.

Also, a method for using a data recorder according to one aspect of the present disclosure is a method for using a data recorder according to the present disclosure, including disposing the data recorder in a radiation environment to record data in the data recorder or reproduce data recorded in the data recorder.

Effects of the Invention

In a data recorder according to one aspect of the present disclosure, a control unit switches a state of a power supply for non-volatile memory to an on state at a timing determined on the basis of an amount of data recorded in a first buffer memory and a mode of input of data from outside via an input interface, the input interface transfers the data recorded in the first buffer memory to a non-volatile memory in a case where the power supply for non-volatile memory is in an on state, and the control unit switches the state the power supply for non-volatile memory to an off state after transferring the data recorded in the first buffer memory to the non-volatile memory. This provides a data recorder capable of reducing adverse effects caused by radiation.

Furthermore, in a data recorder according to another aspect of the present disclosure, when data to be output, stored in a non-volatile memory is output to outside via a second buffer memory, a control unit switches a state of a power supply for non-volatile memory to an off state in part of a period from start of transfer of the data to be output to the second buffer memory to end of transfer of the data to be output to the second buffer memory. This provides a data recorder capable of reducing adverse effects caused by radiation.

Furthermore, in a data recorder according to still another aspect of the present disclosure, a control unit switches a state of a power supply for non-volatile memory to an on state at a timing determined on the basis of an amount of data recorded in a first buffer memory and a mode of input of data from outside via an input interface, the input interface transfers data recorded in the first buffer memory to a non-volatile memory in a case where the power supply for non-volatile memory is in an on state, the control unit switches the state of the power supply for non-volatile memory to an off state after transferring the data recorded in the first buffer memory to the non-volatile memory, and when data to be output, stored in the non-volatile memory is output to outside via a second buffer memory, the control unit switches the state of the power supply for non-volatile memory to an off state in part of a period from start of transfer of the data to be output to the second buffer memory to end of transfer of the data to be output to the second buffer memory. This provides a data recorder capable of reducing adverse effects caused by radiation.

Also, a method for using a data recorder according to one aspect of the present disclosure is a method for using a data recorder according to the present disclosure, including disposing the data recorder in a radiation environment to record data in the data recorder or reproduce data recorded in the data recorder. This provides a method for using a data recorder capable of reducing adverse effects caused by radiation.

Further, objects, features, aspects, and advantages relating to the technique disclosed in the present specification will be more apparent from the following detailed description and the accompanying drawings.

BRIEF DESCRIPTION OF DRAWINGS

FIG. 15 is a block diagram illustrating a configuration of one aspect of a data recorder according to a sixth embodiment.

DESCRIPTION OF EMBODIMENTS

A. First Embodiment

A-1. Configuration

Figure 1:
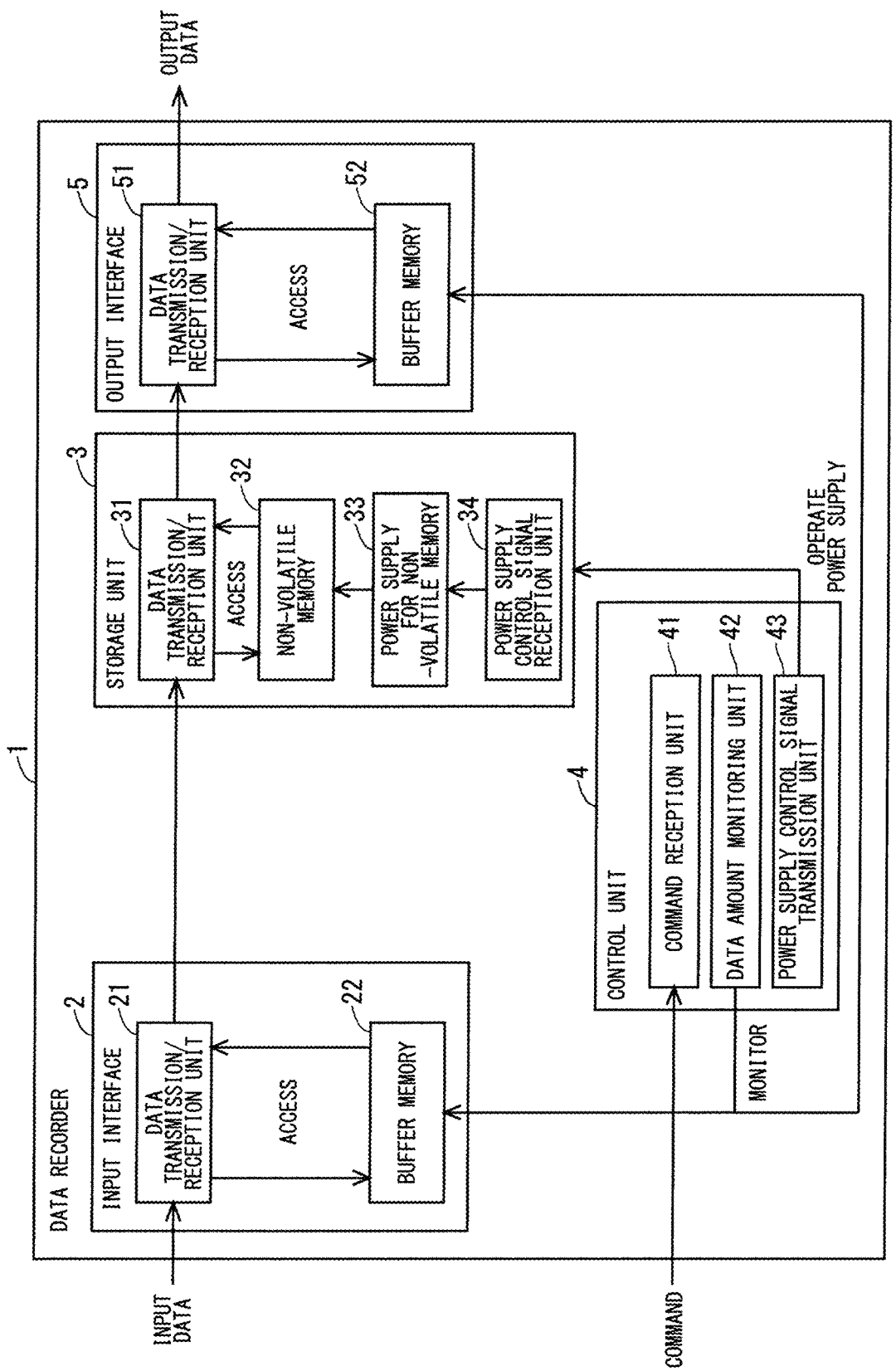
FIG. 1 is a block diagram illustrating a configuration of a data recorder according to a first embodiment.

FIG. 1 is a block diagram illustrating a configuration of a data recorder 1 that is a data recorder according to a first embodiment.

The data recorder 1 includes an input interface 2, a storage unit 3, a control unit 4, and an output interface 5.

The input interface 2 includes a data transmission/reception unit 21 and a buffer memory 22 (first buffer memory).

The input interface 2 receives data transmitted from outside of the data recorder 1 and transfers the data to the storage unit 3.

The input interface 2 temporarily stores the data received from the outside in the buffer memory 22. By temporarily storing the data received from the outside in the buffer memory 22, a period during which a power supply 33 for non-volatile memory included in the storage unit 3 is put into an off state occurs as will be described later.

The storage unit 3 includes a data transmission/reception unit 31, a non-volatile memory 32, the power supply 33 for non-volatile memory, and a power supply control signal reception unit 34. The data transmission/reception unit 31 receives data transferred from the input interface 2 and stores the data in the non-volatile memory 32. In addition, when data is reproduced, data is read from the non-volatile memory 32 and transferred to the output interface 5.

The non-volatile memory 32 is a non-volatile semiconductor memory such as a flash memory, an MRAM and an EEPROM.

The power supply 33 for non-volatile memory is a power supply that supplies power to the non-volatile memory 32, and a state of the power supply 33 for non-volatile memory is switched between an on state and an off state by a power supply control signal transferred from the power supply control signal reception unit 34.

The power supply control signal reception unit 34 receives the power supply control signal transmitted from the control unit 4 and transfers the received power supply control signal to the power supply 33 for non-volatile memory. As described above, the control unit 4 controls on/off of the power supply 33 for non-volatile memory via the power supply control signal reception unit 34.

The control unit 4 includes a command reception unit 41, a data amount monitoring unit 42, and a power supply control signal transmission unit 43.

The command reception unit 41 receives a command indicating start of communication. The command includes information indicating which of recording or reproduction, communication is performed for. In a case where the command is a command instructing reproduction, the command also includes, for example, information designating data to be reproduced.

The data amount monitoring unit 42 monitors an amount of data stored in the buffer memory 22 included in the input interface 2 and the buffer memory 52 included in the output interface 5.

The power supply control signal transmission unit 43 transmits a power supply control signal to the power supply control signal reception unit 34 included in the storage unit 3.

The control unit 4 monitors an amount of data stored in the buffer memory 22 by the data amount monitoring unit 42 and transmits a power supply control signal instructing to switch a state of the power supply 33 for non-volatile memory to an on state to the power supply control signal reception unit 34 by the power supply control signal transmission unit 43 in a case where the amount of the data exceeds a threshold (first threshold, hereinafter referred to as a threshold 400). In the present embodiment, the threshold 400 is determined in advance and stored in the control unit 4.

A method for determining the threshold 400 is not limited, but, for example, a ratio of the amount of the data stored in the buffer memory 22 with respect to capacity of the buffer memory 22 (for example, 80%) may be used. In addition, the threshold 400 may be set on the basis of write speed to the buffer memory 22 and a period required for enabling writing to the non-volatile memory 32 when the state of the power supply 33 for non-volatile memory is switched from an off state to an on state. Hereinafter, a period required for enabling writing to the non-volatile memory 32 after the control unit 4 transmits a power supply control signal instructing to switch the state of the power supply 33 for non-volatile memory to an on state to the power supply control signal reception unit 34 will be referred to as a rise time of the non-volatile memory 32.

The output interface 5 has the same structure as the input interface 2, and the output interface 5 includes a data transmission/reception unit 51 and a buffer memory 52 (second buffer memory). The output interface 5 has a function of receiving data from the storage unit 3 and transmitting the data to outside of the data recorder 1.

The buffer memories 22 and 52 are, for example, any one of or a combination of non-volatile or volatile semiconductor memories such as a random access memory (RAM), a flash memory, an MRAM, and an EEPROM, and rewritable memories such as a magnetic disk, a flexible disk, an optical disk, a compact disk, a mini disk, and a DVD. The buffer memories 22 and 52 may have storage capacity smaller than that of the non-volatile memory 32, and it is easy to reduce influence when a failure partially occurs due to adverse effects of radiation by configuring the buffer memories to be less likely to be adversely affected by radiation, configuring the buffer memories to be a package including a plurality of memory modules, or the like, as compared with the non-volatile memory 32.

A-2. Operation

First, an example of adverse effects on the data recorder 1 caused by radiation will be described. The adverse effect of radiation on semiconductor elements is called a single-event effect (SEE). Major examples of the single-event effect include a single-event upset (hereinafter, referred to as an upset) in which stored data is rewritten by radiation, and a single-event latch-up (SEL, hereinafter, referred to as a latch-up) in which an overcurrent flows. For example, if a complementary metal oxide semiconductor integrated circuit (CMOS IC) is used for the data recorder 1 and radiation strikes the CMOS IC and a latch-up occurs, there is a possibility that the CMOS IC becomes uncontrollable and an overcurrent continues to flow and destroys the circuit. As a countermeasure against the latch-up, it is possible to prevent occurrence of the latch-up in the data recorder 1 or the components thereof by powering off the data recorder 1 or the components thereof.

A-2-1. Operation of Data Reception Processing and Storage Processing

Figure 2:
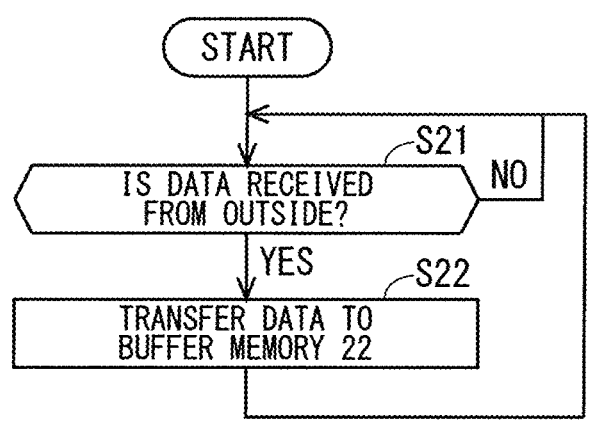
FIG. 2 is a flowchart of data reception processing of the data recorder according to the first embodiment.

FIG. 2 is a flowchart of data reception processing of the data recorder 1.

In the data reception processing of the data recorder 1, the input interface 2 attempts to receive data transmitted from outside of the data recorder 1 (step S21), and if the input interface 2 receives data from the outside (step S21: Yes), the input interface 2 sequentially transfers the received data to the buffer memory 22 and erases the transferred data (step S22). If the input interface 2 does not receive data from outside in step S21 (step S21: No), the input interface 2 repeats an attempt to receive data transmitted from outside in step S21. After step S22, the processing transitions to step S21 again.

Figure 3:
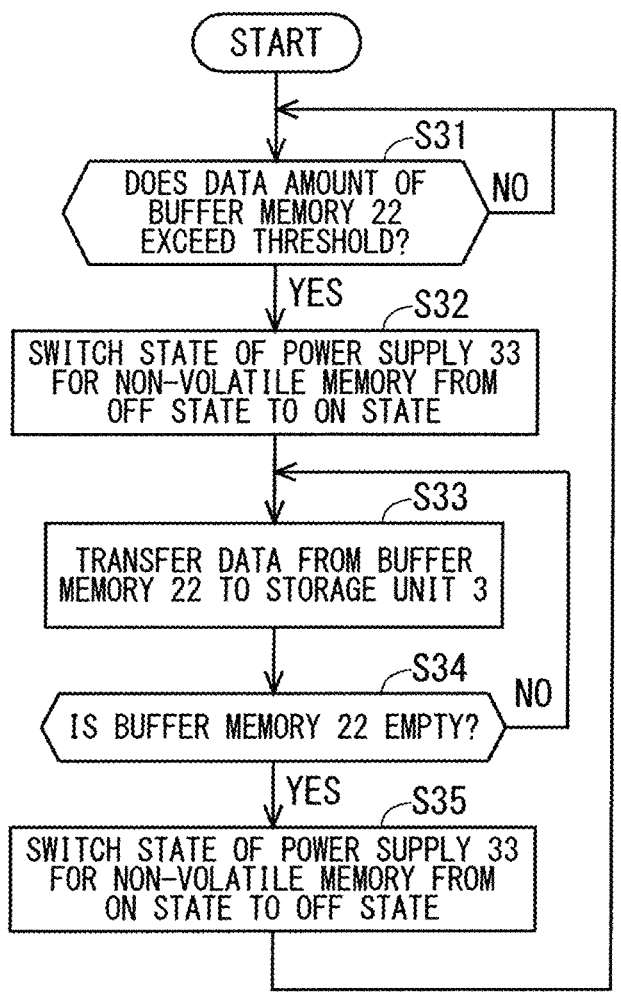
FIG. 3 is a flowchart of storage processing of the data recorder according to the first embodiment.

FIG. 3 is a flowchart of storage processing of the data recorder 1.

The control unit 4 monitors the amount of the data stored in the buffer memory 22 by the data amount monitoring unit 42 and determines whether the amount exceeds the threshold 400 (step S31). In a case where the amount of the data stored in the buffer memory 22 exceeds the threshold 400 (step S31: Yes), the control unit 4 transmits the power supply control signal to the power supply control signal reception unit 34 by the power supply control signal transmission unit 43 and switches the state of the power supply 33 for non-volatile memory from an off state to an on state (step S32). Writing to the non-volatile memory 32 becomes possible if the state of the power supply 33 for the non-volatile memory is switched to an on state, and thus, the data transmission/reception unit 21 reads data from the buffer memory 22 and transfers the data to the storage unit 3 (step S33). The data transferred to the storage unit 3 is written in the non-volatile memory 32.

The data amount monitoring unit 42 monitors the amount of the data stored in the buffer memory 22 again and determines whether the buffer memory 22 is empty (step S34). If the buffer memory 22 is not empty in step S34 (step S34: No), that is, if there is remaining data stored in the buffer memory 22, the processing transitions to step S33, and data transfer to the storage unit 3 is repeated.

If all the data in the buffer memory 22 is transferred and the buffer memory 22 is empty (step S34: Yes), the control unit 4 transmits the power supply control signal to the power supply control signal reception unit 34 by the power supply control signal transmission unit 43 and switches the state of the power supply 33 for non-volatile memory to an off state (step S35).

The data recorder 1 receives data from outside and stores the data in the non-volatile memory 32 by the above-described data reception processing and storage processing. In this event, as in steps S31 and S32 of the flowchart in FIG. 3, the control unit 4 switches the state of the power supply 33 for non-volatile memory to an on state at a timing determined on the basis of the amount of the data recorded in the buffer memory 22, the input interface 2 transfers the data recorded in the buffer memory 22 to the non-volatile memory 32 when the power supply 33 for non-volatile memory is in an on state, and the control unit 4 switches the state of the power supply 33 for non-volatile memory to an off state after transfer of the data recorded in the buffer memory 22 to the non-volatile memory 32 is finished. As a result, it is possible to reduce adverse effects caused by radiation and achieve power saving of the data recorder 1. In particular, even in a case where input of data to the data recorder 1 continues for a long period or input of data to the data recorder 1 is frequently performed, it is possible to reduce adverse effects caused by radiation and achieve power saving of the data recorder 1 by turning off the non-volatile memory 32.

Figure 4:
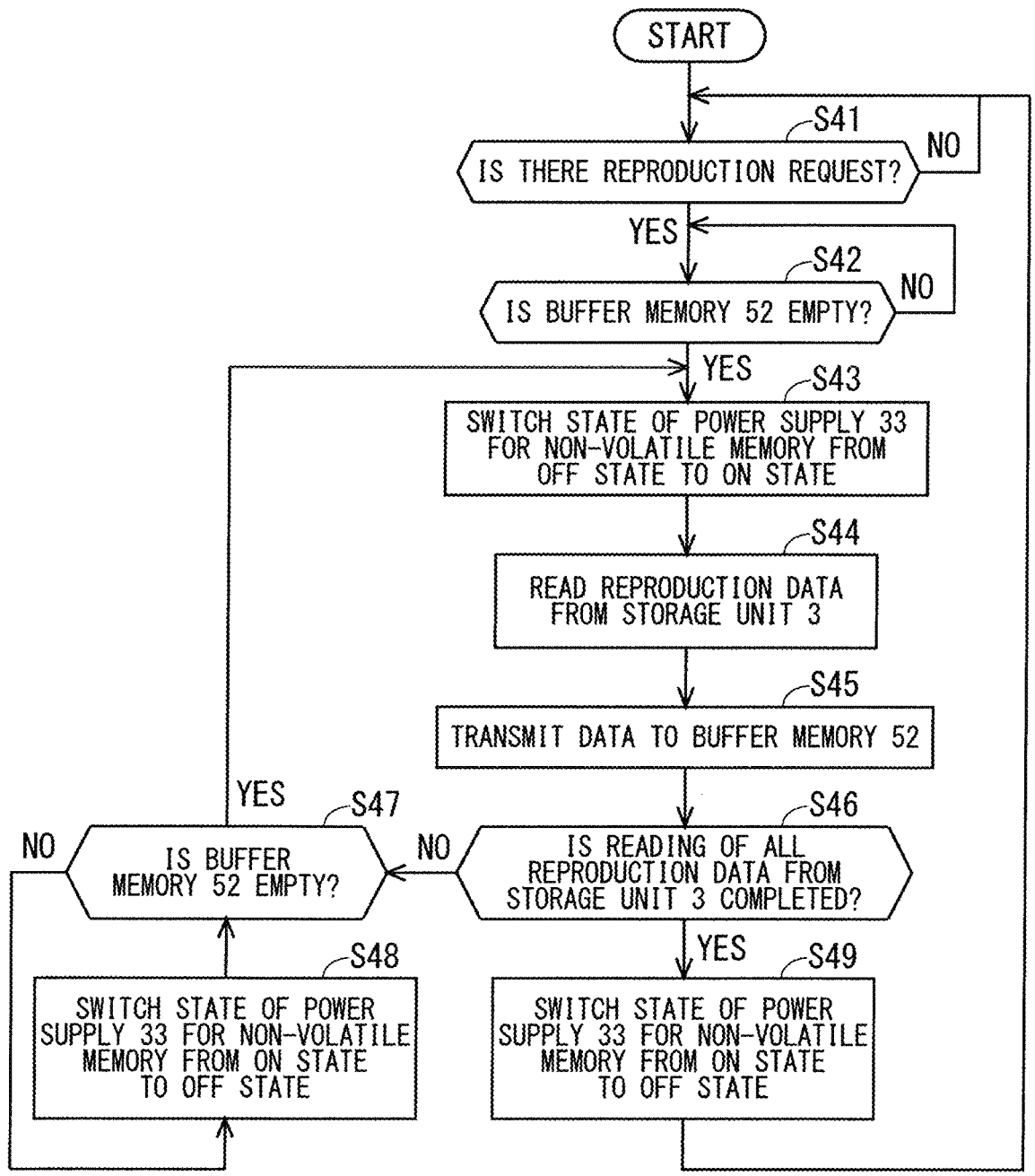
FIG. 4 is a flowchart of reproduction data read processing of the data recorder according to the first embodiment.

A-2-2. Operation of Reproduction Data Read Processing and Reproduction Processing FIG. 4 is a flowchart of reproduction data read processing. The reproduction data read processing is processing of reading the reproduction data from the non-volatile memory 32 to the buffer memory 52 for reproduction processing to be described later. Furthermore, the reproduction data is data to be output from the data recorder 1, that is, data to be reproduced, and is, for example, data designated to be reproduced by a reproduction request command received by the command reception unit 41.

The control unit 4 confirms whether the command reception unit 41 has received a reproduction request command (step S41). If there is a reproduction request command received by the command reception unit 41 (step S41: Yes), the processing proceeds to step S42. If there is no reproduction request command received by the command reception unit 41 (step S41: No), the processing in step S41 is repeated.

In step S42, it is confirmed whether the buffer memory 52 is empty (step S42). If the buffer memory 52 is not empty (step S42: No), the processing in step S42 is repeated until reproduction of the data remaining in the buffer memory 52 is completed and the buffer memory 52 becomes empty.

If the buffer memory 52 is empty (step S42: Yes), the control unit 4 causes the power supply control signal transmission unit 43 to transmit the power supply control signal to the power supply control signal reception unit 34 and switches the state of the power supply 33 for non-volatile memory from an off state to an on state (step S43).

Next, the data transmission/reception unit 31 included in the storage unit 3 reads the reproduction data from the non-volatile memory 32 of the storage unit 3 and transmits the reproduction data to the data transmission/reception unit 51 included in the output interface 5 (step S44).

Next, the data transmission/reception unit 51 writes the reproduction data received from the data transmission/reception unit 31 in the buffer memory 52 (step S45).

In steps S44 and S45, in a case where an amount of reproduction data that has not been read from the non-volatile memory 32 is larger than capacity of the buffer memory 52, reproduction data that can be stored in the buffer memory 52 is read from the non-volatile memory 32 and transmitted to the buffer memory 52 via the data transmission/reception unit 31 and the data transmission/reception unit 51.

Next, the control unit 4 determines whether all the reproduction data is read from the non-volatile memory 32 of the storage unit 3 and transmitted to the buffer memory 52 (step S46).

In a case where reading of part of the reproduction data from the non-volatile memory 32 and transmission of the reproduction data to the buffer memory 52 are not completed (step S46: No), the processing proceeds to step S47.

In step S47, the control unit 4 confirms whether the buffer memory 52 is empty (step S47).

In a case where the buffer memory 52 is not empty in step S47 (step S47: No), the control unit 4 switches the state of the power supply 33 for non-volatile memory to an off state (step S48) and repeats the processing in step S47 until the buffer memory 52 becomes empty through reproduction processing which will be described later. In step S48, the control unit 4 switches the state of the power supply 33 for non-volatile memory to an off state by the power supply control signal transmission unit 43 in a case where the power supply 33 for non-volatile memory is originally in an on state and keeps an off state in a case where the power supply 33 for non-volatile memory is originally in an off state.

In step S47, in a case where the buffer memory 52 is empty (step S47: Yes), the processing proceeds to step S43.

In step S46, in a case where all the reproduction data has been read from the non-volatile memory 32 and transmitted to the buffer memory 52 (step S46: Yes), the control unit 4 switches the state of the power supply 33 for non-volatile memory from an on state to the off state by the power supply control signal transmission unit 43 (step S49), and the processing proceeds to step S41.

Figure 5:
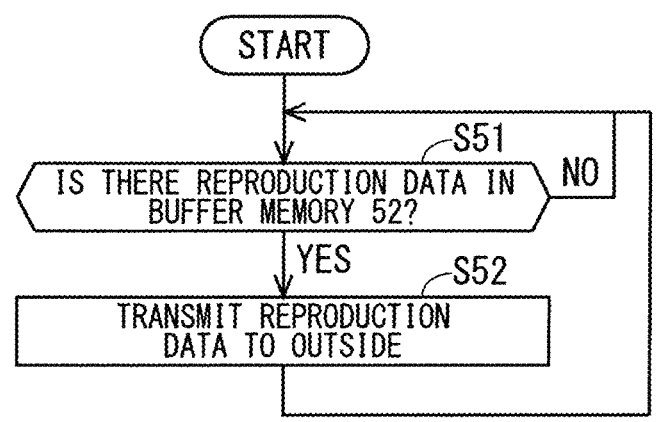
FIG. 5 is a flowchart of reproduction processing of the data recorder according to the first embodiment.

FIG. 5 is a flowchart of the reproduction processing. The reproduction processing is processing of transmitting the reproduction data read from the non-volatile memory 32 in the reproduction data read processing and transmitted to the buffer memory 52 to outside via the output interface 5.

In the reproduction processing, the data transmission/reception unit 51 determines whether there is reproduction data in the buffer memory 52 (step S51), and if there is reproduction data in the buffer memory 52 (step S51: Yes), the data transmission/reception unit 51 transmits the reproduction data in the buffer memory 52 to outside and erases the reproduction data which has been transmitted from the buffer memory 52 (step S52). After step S52, the processing in step S51 is repeated.

If there is no reproduction data in the buffer memory 52 in step S51 (step S51: No), the processing in step S51 is repeated.

The data recorder 1 outputs the reproduction data stored in the non-volatile memory 32 via the buffer memory 52, that is, after storing the reproduction data once in the buffer memory 52, reads the reproduction data from the buffer memory 52 and outputs the reproduction data to outside through the reproduction data read processing and the reproduction processing described above. In this event, in a case where there is a period during which the power supply 33 for non-volatile memory is put into an off state during reproduction of the data, the control unit 4 switches the state of the power supply 33 for non-volatile memory to an off state in part of the period from start of transfer of the reproduction data to the buffer memory 52 to end of transfer of the reproduction data to the buffer memory 52 by the processing in step S48 of the flowchart in FIG. 4. As a result, it is possible to reduce adverse effects caused by radiation and achieve power saving of the data recorder 1. In particular, in a case where data reproduction continues for a long period and data of an amount equal to or larger than the capacity of the buffer memory 52 is reproduced, it is possible to reduce adverse effects caused by radiation and achieve power saving of the data recorder 1.

A-3. Effects

The control unit 4 switches the state of the power supply 33 for non-volatile memory to an off state in part of a period from start of transfer of the reproduction data to the buffer memory 52 to end of transfer of the reproduction data to the buffer memory 52. This can reduce adverse effects caused by radiation.

A-4. First Modification

In the above section <A-2. Operation>, it has been described in <A-2-1. Operation of data reception processing and storage processing> that, when data is input to the data recorder 1, the control unit 4 switches the state of the power supply 33 for non-volatile memory to an on state at a timing determined on the basis of the amount of data recorded in the buffer memory 22 and switches the state of the power supply 33 for non-volatile memory to an off state after transfer of the data recorded in the buffer memory 22 to the non-volatile memory 32 is completed. However, in the flowchart in FIG. 3, instead of on/off control of the power supply 33 for non-volatile memory in steps S32 and S35, the data recorder 1 may be configured so that control is performed such that the power supply 33 for non-volatile memory is put into an on state while data is input from outside, and the power supply 33 for non-volatile memory is put into an off state during a period other than a period while data is input from outside. Also in the data recorder 1 having such a configuration, the effects described in <A-3. Effects> can be obtained.

A-5. Second Modification

In steps S42 and S47, the control unit 4 determines whether the buffer memory 52 is empty, but instead of determining whether the buffer memory 52 is empty, the control unit 4 may determine whether the amount of the data stored in the buffer memory 52 becomes less than a threshold (second threshold, hereinafter, referred to as a threshold 401). The threshold 401 is determined as a value as small as possible in consideration of the rise time of the non-volatile memory 32, for example, within a range in which the buffer memory 52 does not empty before the power supply 33 for non-volatile memory is put into an on state and reading from the non-volatile memory 32 becomes possible and is stored in the control unit 4. With such a configuration, the control unit 4 switches the state of the power supply 33 for non-volatile memory to an off state in part of the period until transfer of the reproduction data to the buffer memory 52 is completed. As a result, it is possible to increase a period during which the power supply 33 for non-volatile memory is in an off state without hindering data output to outside for the data recorder 1, reduce adverse effects caused by radiation, and achieve power saving of the data recorder 1.

In addition, in steps S42 and S47, in a case where the amount of reproduction data that has not been read from the non-volatile memory 32 is equal to or less than an amount of free space of the buffer memory 52, the processing proceeds to step S43, and the reproduction data that has not been read may be transferred to the buffer memory 52.

A-6. Others

In the above <A-2. Operation>, the description has been given assuming that writing to the non-volatile memory 32 and reading from the non-volatile memory 32 are not performed except for the processing in the description with respect to each of the storage processing and the reproduction data read processing. However, when the power supply 33 for non-volatile memory is tried to be put into an off state in the storage processing or the reproduction data read processing, it is also conceivable that writing to the non-volatile memory 32 or reading from the non-volatile memory 32 or both are performed in other processing performed at the same time. In such a case, the control unit 4 switches the state of the power supply 33 for non-volatile memory to an off state only at a timing when writing to the non-volatile memory 32 and reading from the non-volatile memory 32 are not performed so as not to hinder writing to the non-volatile memory 32 or reading from the non-volatile memory 32 which is being executed.

For example, in step S35 of the flowchart of the storage processing illustrated in FIG. 3, at a timing when writing to the non-volatile memory 32 or reading from the non-volatile memory 32 or both in processing other than the storage processing is performed, the control unit 4 does not switch the state of the power supply 33 for non-volatile memory to an off state, and the processing proceeds to step S31. The timing when writing to the non-volatile memory 32 or reading from the non-volatile memory 32 or both in processing other than the storage processing is performed is, for example, a timing when the processing of step S44 of the flowchart of the reproduction data read processing illustrated in FIG. 4 is performed. At the timing when writing to the non-volatile memory 32 and reading from the non-volatile memory 32 are not performed in processing other than the storage processing in step S35, as described in <A-2. Operation>, the control unit 4 switches the state of the power supply 33 for non-volatile memory to an off state, and the processing proceeds to step S31. The same applies to steps S48 and S49 of the flowchart of the reproduction data read processing illustrated in FIG. 4.

The control unit 4 may be configured to switch the state of the power supply 33 for non-volatile memory to an off state even at a timing when writing to the non-volatile memory 32 or reading from the non-volatile memory 32 or both of them are performed in a predetermined situation and to switch the state of the power supply 33 for non-volatile memory to an off state only at a timing when writing to the non-volatile memory 32 and reading from the non-volatile memory 32 are not performed in a situation other than the predetermined situation. The predetermined situation is, for example, a situation in which a command for forcibly switching the state of the power supply 33 for non-volatile memory to an off state is received from outside via the command reception unit 41. In addition, in a case where a data recorder has a function of switching the state of the power supply 33 for non-volatile memory to an off state in a case where an overcurrent is detected as in the case of a data recorder 1c of a third embodiment which will be described later, the predetermined situation is, for example, a situation where the state of the power supply 33 for non-volatile memory is switched to an off state in a case where an overcurrent of the power supply 33 for non-volatile memory is detected.

B. Second Embodiment

In the data recorder 1 of the first embodiment, in a case where the amount of the data stored in the buffer memory 22 included in the input interface 2 exceeds the threshold, the state of the power supply 33 for non-volatile memory is changed from an off state to an on state. The threshold 400 used in the first embodiment as the threshold for the amount of the data stored in the buffer memory 22 is a fixed value and does not fluctuate. However, in a case where communication speed at which the data recorder receives data from outside or transmits data to outside is not constant, it is desirable that the threshold can be dynamically changed from the viewpoint of countermeasures against radiation and power saving.

B-1. Configuration

Figure 6:
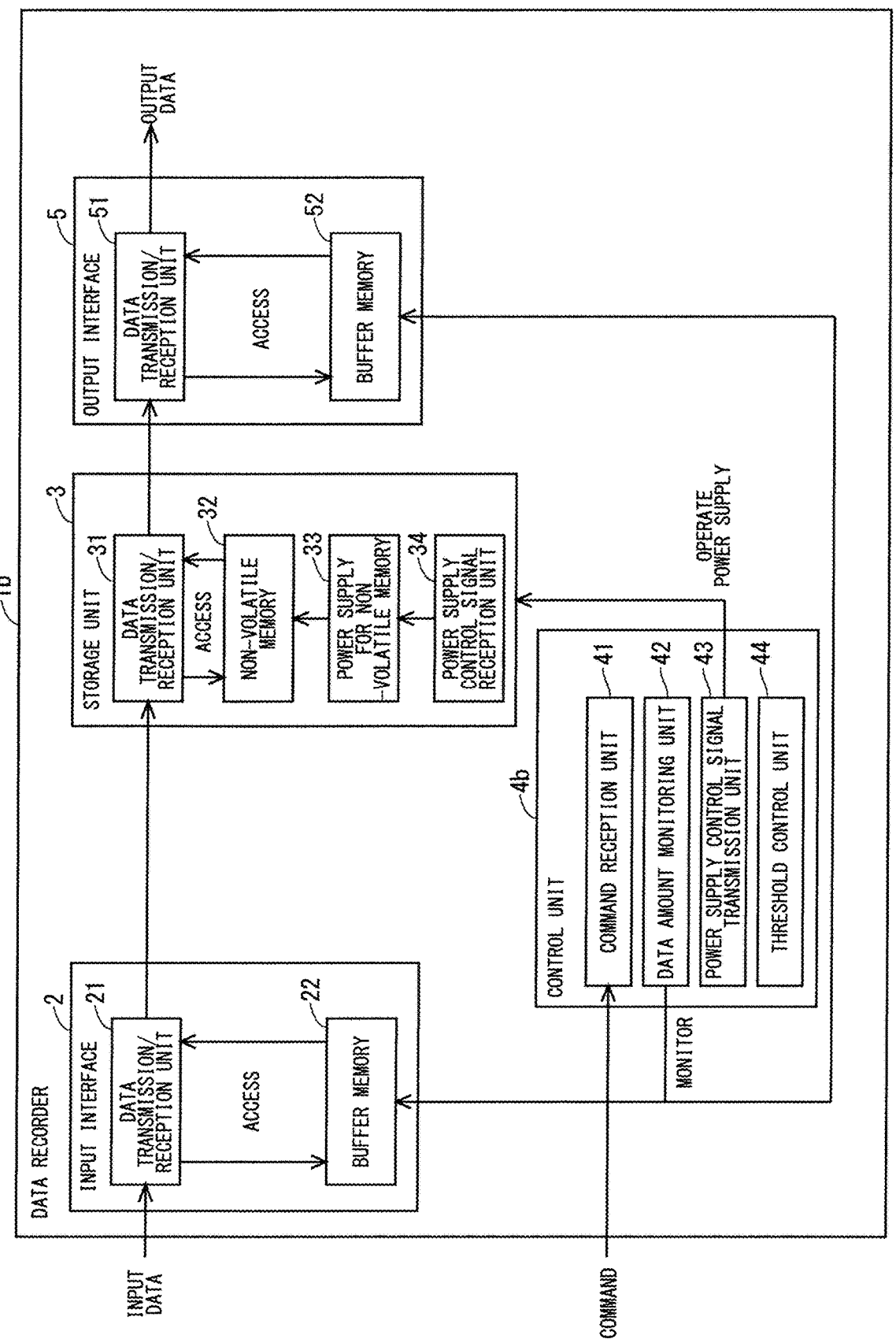
FIG. 6 is a block diagram illustrating a configuration of a data recorder according to a second embodiment.

FIG. 6 is a block diagram illustrating a configuration of a data recorder 1b that is a data recorder according to a second embodiment.

The data recorder 1b is different from the data recorder 1 that is the data recorder according to the first embodiment in that the control unit 4 is changed to a control unit 4b. While in the second embodiment, a limitation is imposed on the input interface 2 and the output interface 5 such that communication can be performed with outside at a plurality of kinds of communication speed, the input interface 2 and the output interface 5 will be described as being the same interfaces as the interfaces in the first embodiment. In other respects, a configuration of the data recorder 1b is the same as that of the data recorder 1. The communication speed with outside is data input speed in a case where data is input from outside to the data recorder 1b and is data output speed in a case where data is output from the data recorder 1b to outside.

The data recorder 1b can communicate with outside at a plurality of kinds of communication speed and may have a configuration in which the communication speed is different between input and output.

The control unit 4b further includes a threshold control unit 44 as compared with the control unit 4. Similarly to the control unit 4 of the first embodiment, the control unit 4b monitors the amount of the data stored in the buffer memory 22 by the data amount monitoring unit 42 and transmits the power supply control signal giving an instruction to switch the state of the power supply 33 for non-volatile memory to an on state to the power supply control signal reception unit 34 by the power supply control signal transmission unit 43 in a case where the amount of the data exceeds the threshold 400. In the present embodiment, the threshold control unit 44 controls the threshold 400. The command indicating start of communication received by the command reception unit 41 included in the control unit 4b includes information on communication speed. In other respects, a configuration of the control unit 4b is similar to that of the control unit 4.

B-2. Operation

Operation of data reception processing and storage processing of the data recorder 1b at the time of data input to the data recorder 1b is similar to the operation described in <A-2-1. Operation of data reception processing and storage processing> of the first embodiment except that the threshold 400 is controlled by the threshold control unit 44. Operation of reproduction data read processing and reproduction processing at the time of data reproduction of the data recorder 1b is similar to the operation described in <A-2-2. Operation of reproduction data read processing and reproduction processing> of the first embodiment. However, the control unit 4 in the description of the first embodiment is read as the control unit 4b.

Control of the threshold 400 based on the data input speed in a case where the data recorder 1b receives data from outside will be described below.

As an example, in a case where there are two types of communication speed, communication at low communication speed will be referred to as low-speed data communication, and the other will be referred to as high-speed data communication.

In a case where the threshold 400 is set to be suitable for low-speed data communication, that is, in a case where the threshold 400 is set so that the buffer memory 22 does not overflow and the buffer memory 22 can be sufficiently utilized in a case of low-speed data communication, if high-speed data communication is performed using the threshold 400 of the same value, the buffer memory 22 may overflow.

On the other hand, in a case where the threshold 400 is set to be suitable for high-speed data communication, that is, in a case where the threshold 400 is set so that the buffer memory 22 does not overflow and the buffer memory 22 can be sufficiently utilized in a case of high-speed data communication, if low-speed data communication is performed with the threshold 400 of the same value, the state of the power supply 33 for non-volatile memory is switched to an on state in a state where there is an amount of free space in the buffer memory 22, that is, there is a period during which the power supply 33 for non-volatile memory can be put into an off state. In other words, there is room for extending a period during which the power supply 33 for non-volatile memory is in an off state, and there is room for more effectively taking countermeasures against radiation and saving power.

Hereinafter, description will be specifically given.

Storage capacity of the buffer memory 22 is set to $M_B$ [Gbit], and the amount of the data stored in the buffer memory 22 is set to $M_W$ [Gbit]. In addition, the rise time of the non-volatile memory 32 is set to $T_{POW}$ [s], and communication speed of input from outside is set to A [Gbps]. In the present embodiment, the communication speed A is either communication speed $A^0$ in the high-speed data communication or communication speed $A^1$ in the low-speed data communication, but it is assumed that the communication speed A is fixed to either one in a series of communication. $A^0$ and $A^1$ satisfy $A^0 > A^1$. If a time at which the buffer memory 22 overflows is set to $T_{OVR}$ [s], $T_{OVR} = (M_B - M_W)/A$ is satisfied.

In order to prevent the non-volatile memory 32 from overflowing in operation of the flowchart illustrated in FIG. 3, the time $T_{POW}$ until the non-volatile memory 32 operates and the time $T_{OVR}$ until the non-volatile memory 32 overflows need to satisfy a relationship of $T_{OVR} = (M_B - M_W)/A \geq T_{POW}$. If a maximum value of $M_W$ satisfying this relationship is set to $M_{LIM}$, $M_{LIM} = M_B - A \cdot T_{POW}$. $M_{LIM}$ in a case of $A = A^0$ is set to $M^0_{LIM}$, and $M_{LIM}$ in a case of $A = A^1$ is set to $M^1_{LIM}$.

More specifically, as an example, a case where $M_B = 5$ Gbits, $A^0 = 2$ Gbps, $A^1 = 1$ Gbps, $T_{POW} = 1$ s, and data transfer speed from the buffer memory 22 to the non-volatile memory 32 is 5 Gbps faster than data input speed from outside will be considered. From the above expression, $M^0_{LIM}$ and $M^1_{LIM}$ are respectively $M^0_{LIM}$=3 Gbits and $M^1_{LIM}$=4 Gbits. The values described here are examples and can be changed in accordance with design of the data recorder 1b.

Figure 7:
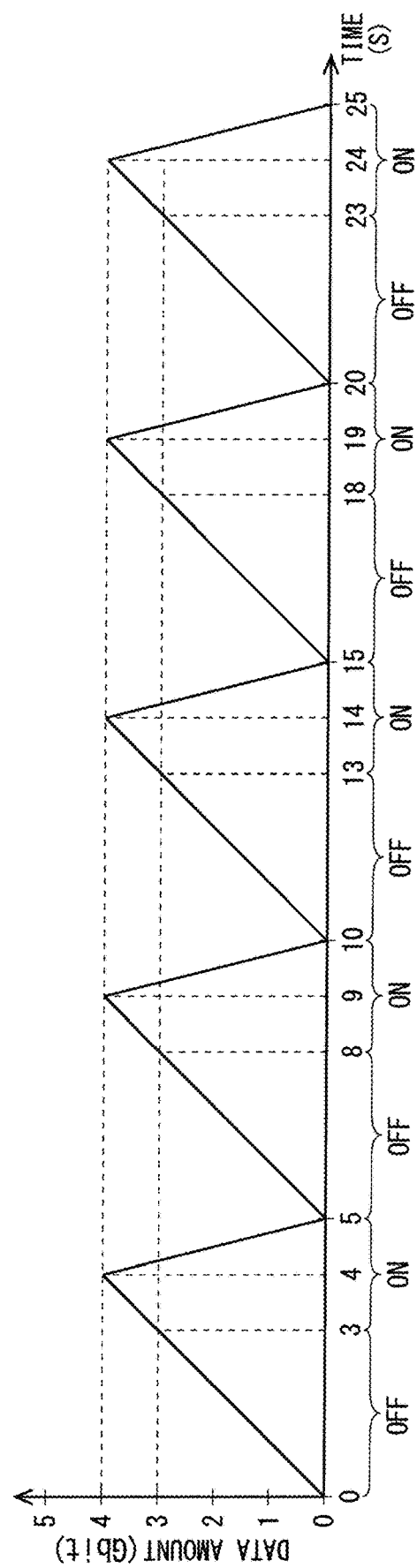
FIG. 7 is a view for explaining operation of the data recorder according to the second embodiment.
Figure 8:
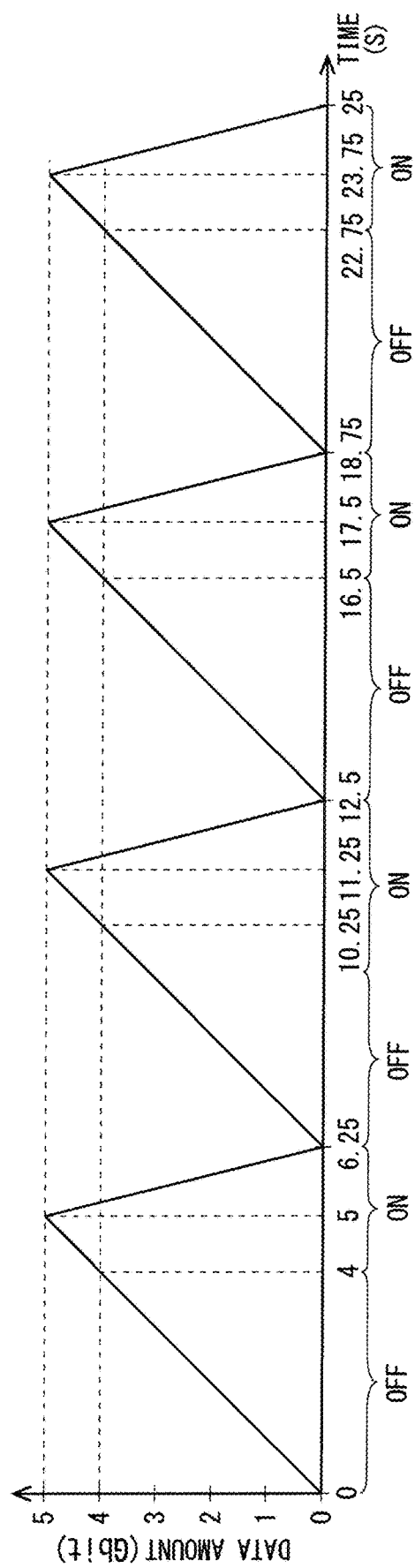
FIG. 8 is a view for explaining operation of the data recorder according to the second embodiment.

FIGS. 7 and 8 respectively illustrate fluctuation of an amount $M_W$ of the data recorded in the buffer memory 22 in a case where the threshold 400 is $M^0_{LIM}$ and in a case where the threshold 400 is $M^1_{LIM}$ in the low-speed data communication.

FIG. 7 illustrates the fluctuation of $M_W$ in a case where the threshold 400 is $M^0_{LIM}$. If communication is started at time t=0 s, $M_W$ becomes 3 Gbits at time t=3 s and reaches $M^0_{LIM}$, and thus, the control unit 4b sends a signal giving an instruction to switch the state of the power supply 33 for non-volatile memory to an on state. $T_{POW}$=1 s, and thus, writing to the non-volatile memory 32 becomes possible after time t=4 s. The data transfer speed from the buffer memory 22 to the non-volatile memory 32 is 5 Gbps, and thus, a difference of 4 Gbps from the communication speed $A^1$=1 Gbps is decrease speed of $M_W$, and $M_W$ becomes 0 Gbit at t=5 s, and the control unit 4b switches the state of the power supply 33 for non-volatile memory to an off state. Thereafter, the same operation is repeated until t=25 s, data of 25 Gbits is input from outside to the data recorder 1b, and a period during which the power supply 33 for non-volatile memory is in an on state is 10 seconds in total.

FIG. 8 illustrates fluctuation in $M_W$ in a case where the threshold 400 is $M^1_{LIM}$. If communication is started at time t=0 s, $M_W$ becomes 4 Gbits at time t=4 s and reaches $M^1_{LIM}$, and thus, the control unit 4b sends a signal giving an instruction to switch the state of the power supply 33 for non-volatile memory to an on state. $T_{POW}$=1 s, and thus, writing to the non-volatile memory 32 becomes possible after time t=5 s. The data transfer speed from the buffer memory 22 to the non-volatile memory 32 is 5 Gbps, and thus, a difference of 4 Gbps from the communication speed $A^1$=1 Gbps is decrease speed of $M_W$, $M_W$ becomes 0 Gbit at t=6.25 s, and the control unit 4b switches the state of the power supply 33 for non-volatile memory to an off state. Thereafter, the same operation is repeated until t=25 s, data of 25 Gbits is input from outside to the data recorder 1b, and a period during which the power supply 33 for non-volatile memory is in an on state is 9 seconds in total.

As described above, even in a case where data is input at the same input speed and the same amount of data is recorded, the period during which the power supply 33 for non-volatile memory is in an on state can be reduced by setting the threshold 400 to a greater value. In a case where the threshold 400 is $M^1_{LIM}$, the buffer memory 22 can be effectively utilized as compared with a case where the threshold 400 is $M^0_{LIM}$, and thus, the number of times of switching between an on state and an off state of the power supply 33 for non-volatile memory can be reduced, so that the period during which the power supply 33 for non-volatile memory is in an on state can be reduced accordingly. In the example of FIG. 7, the period during which the power supply 33 for non-volatile memory is in an on state for the rise time of the non-volatile memory 32 is 5 seconds in 25 seconds, but in the example of FIG. 8, the number of times of switching between an on state and an off state of the power supply 33 for non-volatile memory is reduced, so that the period during which the power supply 33 for non-volatile memory is in an on state for the rise time of the non-volatile memory 32 is 4 seconds in 25 seconds.

As described above, in a range in which the non-volatile memory 32 does not overflow in order not to interfere with data input from outside, the threshold of a value as large as possible is $M^0_{LIM}$ in a case of high-speed data communication and $M^1_{LIM}$ in a case of low-speed data communication. Thus, in the data recorder 1b of the present embodiment, the threshold control unit 44 sets the threshold 400 to $M^0_{LIM}$ in a case of high-speed data communication and sets the threshold 400 to $M^1_{LIM}$ in a case of low-speed data communication on the basis of the data input speed from outside. In a case where there is a possibility that the rise time of the non-volatile memory 32 fluctuates, the threshold 400 is desirably set slightly smaller than $M^0_{LIM}$ or $M^1_{LIM}$ in consideration of the fluctuation.

As described above, in the data recorder 1b of the present embodiment, the control unit 4b switches the state of the power supply 33 for non-volatile memory to an on state at the timing determined on the basis of the amount of the data recorded in the buffer memory 22 and the data input speed from outside via the input interface 2. More specifically, the threshold control unit 44 included in the control unit 4b determines the threshold 400 on the basis of the data input speed from outside, and the control unit 4b switches the state of the power supply 33 for non-volatile memory to an on state in a case where the amount of the data recorded in the buffer memory 22 exceeds the threshold 400 as indicated in steps S31 and S32 of the flowchart of FIG. 3. In addition, in a case where the power supply 33 for non-volatile memory is in an on state, the input interface 2 transfers the data recorded in the buffer memory 22 to the non-volatile memory 32, and the control unit 4 switches the state of the power supply 33 for non-volatile memory to an off state after transferring the data recorded in the buffer memory 22 to the non-volatile memory 32. With such a configuration, the period during which the power supply 33 for non-volatile memory is in the on state is reduced, so that it is possible to further reduce adverse effects caused by radiation and further save power of the data recorder 1b. In particular, as described above, even in a case where the data input to the data recorder 1b continues for a long period or the data input to the data recorder 1b is frequently performed, it is possible to further reduce adverse effects caused by radiation and further save power of the data recorder 1b.

In the above description, when the state of the power supply 33 for non-volatile memory is switched from an on state to an off state, it has been described that the state of the power supply 33 for non-volatile memory can be instantaneously switched to an off state after writing to the non-volatile memory 32 is completed. In a case where it takes time until the state of the power supply 33 for non-volatile memory is switched to an off state after writing to the non-volatile memory 32 is finished, a period corresponding to the time can be reduced in accordance with decrease in the number of times of switching between an on state and an off state of the power supply 33 for non-volatile memory by switching the state of the power supply 33 for non-volatile memory to an on state at a timing determined by the threshold control unit 44 on the basis of the data input speed from outside.

Although FIGS. 7 and 8 have been described assuming that the data input speed is constant during a series of data input, the data input speed may change during the series of data input. In that case, for example, in a case where the amount of the data recorded in the buffer memory 22 exceeds the threshold 400 determined on the basis of the data input speed after the change, the control unit 4b permits the change of the data input speed after the amount of the data recorded in the buffer memory 22 becomes equal to or less than the threshold 400 determined on the basis of the data input speed after the change.

Although it has been described that the threshold control unit 44 controls the threshold 400 according to the data input speed from outside, the threshold control unit 44 can also obtain the data input speed from outside by monitoring information on communication speed included in the command from outside received by the command reception unit 41, information on an operating condition of the data transmission/reception unit 21, and fluctuation speed of the amount of the data stored in the buffer memory 22, also in which case, it can be said that the threshold control unit 44 substantially controls the threshold 400 on the basis of the data input speed.

Although it has been described that the control unit 4b switches the state of the power supply 33 for non-volatile memory to an on state at the timing determined on the basis of the amount of the data recorded in the buffer memory 22 and the data input speed from outside via the input interface 2, in general, the timing may be determined on the basis of a mode of input of data instead of the data input speed. For example, in a case where it is known from the command received by the command reception unit 41 that data is intermittently input at intervals for each group of a certain amount or less, the threshold 400 may be controlled on the basis of the certain amount, for example, such that data is transferred to the non-volatile memory 32 if an amount of free space becomes the certain amount or less.

B-3. Effects

In the data recorder 1b, the control unit 4b switches the state of the power supply 33 for non-volatile memory to an on state at the timing determined on the basis of the amount of the data recorded in the buffer memory 22 and the data input speed from outside via the input interface 2, the input interface 2 transfers the data recorded in the buffer memory 22 to the non-volatile memory 32 in a case where the power supply 33 for non-volatile memory is in an on state, and the control unit 4 switches the state of the power supply 33 for non-volatile memory to an off state after transferring the data recorded in the buffer memory 22 to the non-volatile memory 32. This can reduce adverse effects caused by radiation.

B-4. First Modification

In the second embodiment, the timing at which the state of the power supply 33 for non-volatile memory is switched to an on state when data is input to the data recorder 1b from outside has been described. When data is reproduced, the control unit 4b may similarly control the timing at which the state of the power supply 33 for non-volatile memory is switched to an on state on the basis of the amount of the data recorded in the buffer memory 52 and a mode of output of data to outside.

For example, the control unit 4b controls the threshold 401 described in <A-5. Second modification> on the basis of a mode of output of data to outside.

For example, the threshold control unit 44 sets the threshold as small as possible among thresholds at which the buffer memory 52 does not become empty before data can be read from the non-volatile memory 32 after step S43 according to the mode of output of data that is being executed, for example, data output speed. As a result, it is possible to prevent interfering with output of data to outside by controlling on/off of the power supply 33 for non-volatile memory, reduce the period during which the power supply 33 for non-volatile memory is in an on state, reduce adverse effects caused by radiation, and achieve power saving of the data recorder 1b. In particular, in a case where data reproduction continues for a long period and data of an amount equal to or larger than the capacity of the buffer memory 52 is reproduced, it is possible to reduce adverse effects caused by radiation and achieve power saving of the data recorder 1b.

B-5. Second Modification

In the above <B-2. Operation>, the operation of the reproduction data read processing and the reproduction processing at the time of data reproduction of the data recorder 1b has been described as being similar to the operation described in <A-2-2. Operation of reproduction data read processing and reproduction processing> of the first embodiment. However, the control unit 4 of the data recorder 1b may be configured to keep the power supply 33 for non-volatile memory in an on state from start of transfer of the reproduction data to the buffer memory 52 to end of transfer of the reproduction data to the buffer memory 52, that is, not to perform the operation in step S48 in the flowchart of FIG. 4. The effects described in <B-3. Effects> can also be obtained by the data recorder 1b of the present modification.

C. Third Embodiment

In the first and second embodiments, the state of the power supply 33 for non-volatile memory is switched to an off state in a case where it is not necessary to switch the state of the power supply 33 for non-volatile memory to an on state, thereby reducing, for example, frequency of latch-ups due to radiation. However, there is a possibility that a latch-up due to radiation may occur during operation of the non-volatile memory 32, and thus, it is more desirable to take countermeasures in a case where a latch-up occurs when the power supply 33 for nonvolatile memory is in an on state. In a data recorder 1c, which is the data recorder according to the third embodiment, a current value of the power supply 33 for non-volatile memory is monitored in order to take countermeasures against occurrence of a latch-up, and when an overcurrent is detected, the state of the power supply 33 for non-volatile memory is switched to an off state.

C-1. Configuration

Figure 9:
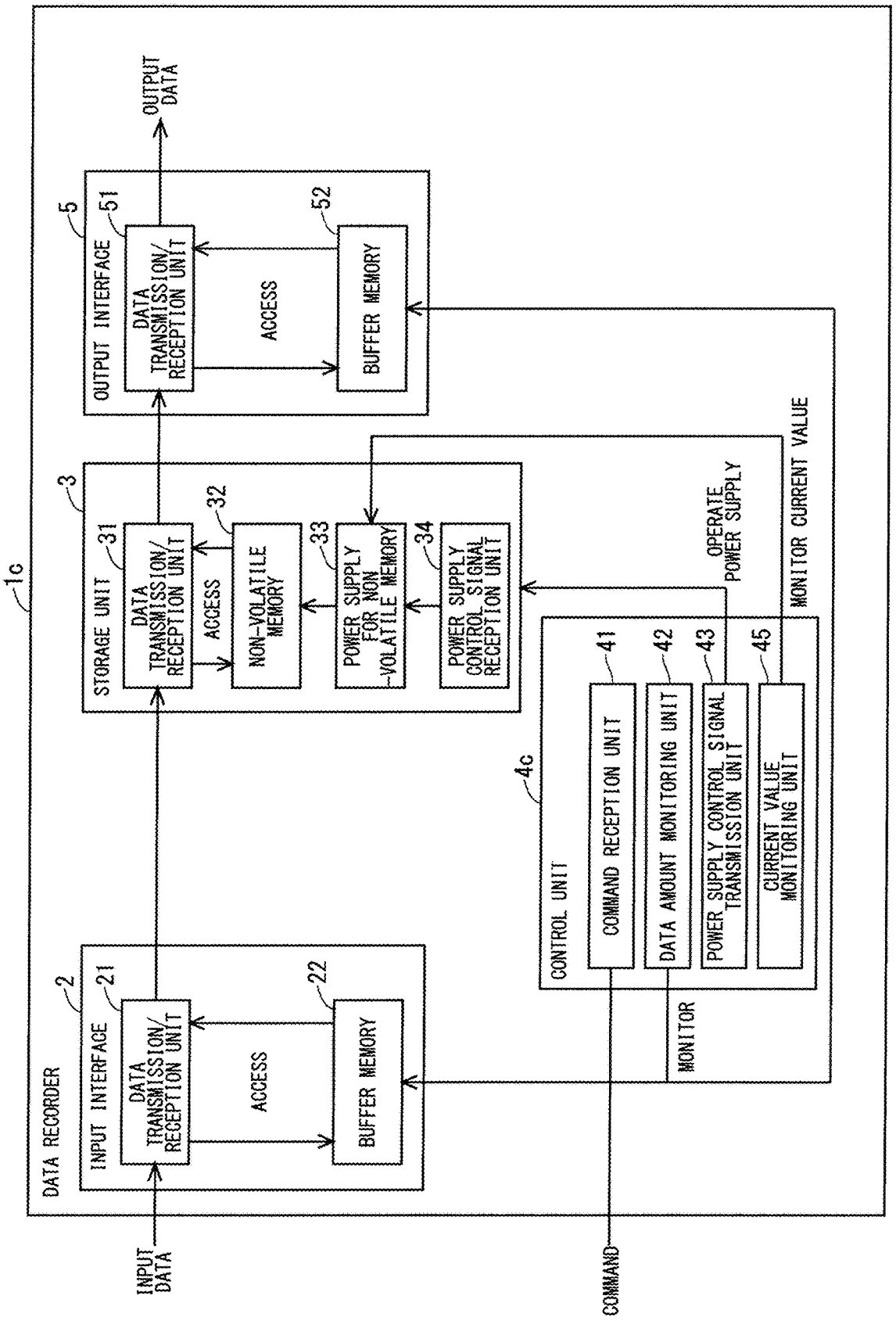
FIG. 9 is a block diagram illustrating a configuration of a data recorder according to a third embodiment.

FIG. 9 is a block diagram illustrating a configuration of the data recorder 1c.

The data recorder 1c is different from the data recorder 1 that is the data recorder according to the first embodiment in that the control unit 4 is changed to a control unit 4c. In other respects, a configuration of the data recorder 1c is the same as that of the data recorder 1.

The control unit 4c further includes a current value monitoring unit 45 as compared with the control unit 4. The current value monitoring unit 45 acquires and monitors a current value of the power supply 33 for non-volatile memory. The current value monitoring unit 45 acquires the current value of the power supply 33 for non-volatile memory from, for example, an ammeter provided in the power supply 33 for non-volatile memory.

In the control unit 4, a current threshold (third threshold, hereinafter, a current threshold 60), which is a current value of the non-volatile memory 32 and the power supply 33 for non-volatile memory, safe in the specifications, is recorded in advance. Furthermore, the control unit 4c performs processing for detecting a latch-up and preventing failures or reducing frequency of failures, which will be described in <C-2. Operation>. A configuration of the control unit 4c is the same as that of the control unit 4 in other points.

Although the control unit 4c further includes the current value monitoring unit 45 as compared with the control unit 4, the control unit 4c may further include the current value monitoring unit 45 as compared with the control unit 4b, and the data recorder 1c may also perform operation similar to the <B-2. Operation>.

C-2. Operation

Similarly to the data recorder 1, the data recorder 1c performs the operation of <A-2. Operation>. However, in the description of <A-2. Operation>, the control unit 4 is read as the control unit 4c.

Figure 10:
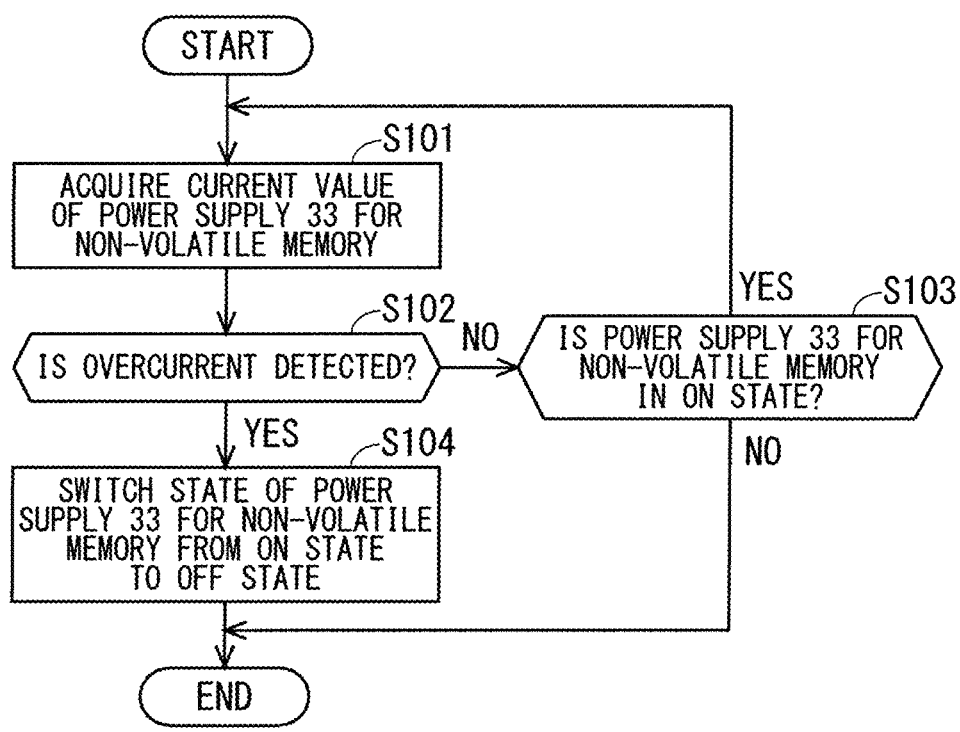
FIG. 10 is a flowchart of processing for monitoring a current value of a power supply for non-volatile memory of the data recorder according to the third embodiment.

FIG. 10 is a flowchart illustrating processing in which the data recorder 1c detects a latch-up and prevents failures or reduces frequency of failures.

When the state of the power supply 33 for non-volatile memory becomes an on state, the operation of the flowchart illustrated in FIG. 10 is started.

When the state of the power supply 33 for non-volatile memory becomes an on state, the current value monitoring unit 45 acquires a value of a current flowing through the power supply 33 for non-volatile memory (step S101). The value of the current flowing through the power supply 33 for non-volatile memory measured by the current value monitoring unit 45 will be hereinafter referred to as a measured current value.

The current value monitoring unit 45 determines whether the measured current value exceeds the current threshold 60 (step S102). In a case where the measured current value does not exceed the current threshold 60, that is, in a case where no overcurrent is detected (step S102: No), the processing proceeds to step S103.

In step S103, the control unit 4c confirms whether the power supply 33 for non-volatile memory is in an on state, and in a case where the power supply 33 for non-volatile memory is in an off state (step S103: No), the control unit 4c ends the operation of the flowchart illustrated in FIG. 10. In step S103, in a case where the power supply 33 for non-volatile memory is in an on state (step S103: Yes), the processing proceeds to step S101.

By the processing in steps S101, S102, and S103, the current value monitoring unit 45 continues to monitor whether the value of the current flowing through the power supply 33 for non-volatile memory exceeds the current threshold 60 while the power supply 33 for non-volatile memory is in an on state.

In step S102, in a case where the current value monitoring unit 45 determines that the measured current value exceeds the current threshold 60, that is, in a case where an overcurrent is detected (step S102: Yes), the control unit 4c switches the state of the power supply 33 for non-volatile memory to an off state by the power supply control signal transmission unit 43 (step S104). However, in a case where the power supply 33 for non-volatile memory includes a plurality of power supply apparatuses and each of the plurality of power supply apparatuses is supplying power to the non-volatile memory 32, only a state of a power supply apparatus in which an abnormality is detected may be switched to an off state.

If the state of the power supply 33 for non-volatile memory is switched to an off state in step S104, the operation of the flowchart illustrated in FIG. 10 ends.

As described above, the control unit 4c switches the state of the power supply 33 for the nonvolatile memory to an off state at the timing determined by the current value monitoring unit 45 on the basis of the measured current value. Specifically, in a case where the measured current value exceeds the current threshold 60, the state of the power supply 33 for non-volatile memory is switched to an off state. As a result, it is possible to detect occurrence of a latch-up that may occur in an on state of the power supply 33 for non-volatile memory and prevent failures of the data recorder 1c due to the latch-up or reduce frequency of failures.

C-3. Effects

In the data recorder 1c, the control unit 4c includes the current value monitoring unit 45, and the control unit 4c switches the state of the power supply 33 for non-volatile memory to an off state at the timing determined by the current value monitoring unit 45 on the basis of the measured current value. As a result, the data recorder 1c can detect occurrence of a latch-up and prevent failures of the data recorder 1c due to the latch-up or reduce frequency of failures.

D. Fourth Embodiment

In all of the data recorder 1, the data recorder 1b, and the data recorder 1c described in the first to third embodiments, occurrence of an upset and a latch-up is prevented by switching the state of the power supply 33 for non-volatile memory between an on state and an off state.

However, it is more desirable to have an additional countermeasure against uncorrectable soft errors due to accumulation of upsets.

In general, by using an error correction code, it is possible to detect and correct an error in a case where an upset occurs. However, in a case where soft errors caused by an upset are accumulated and the errors are accumulated beyond correction capability of the error correction code, the errors cannot be detected and corrected.

A data recorder 1d, which is a data recorder according to the present embodiment, suppresses occurrence of uncorrectable soft errors by reading data and writing back corrected data.

D-1. Configuration

Figure 11:
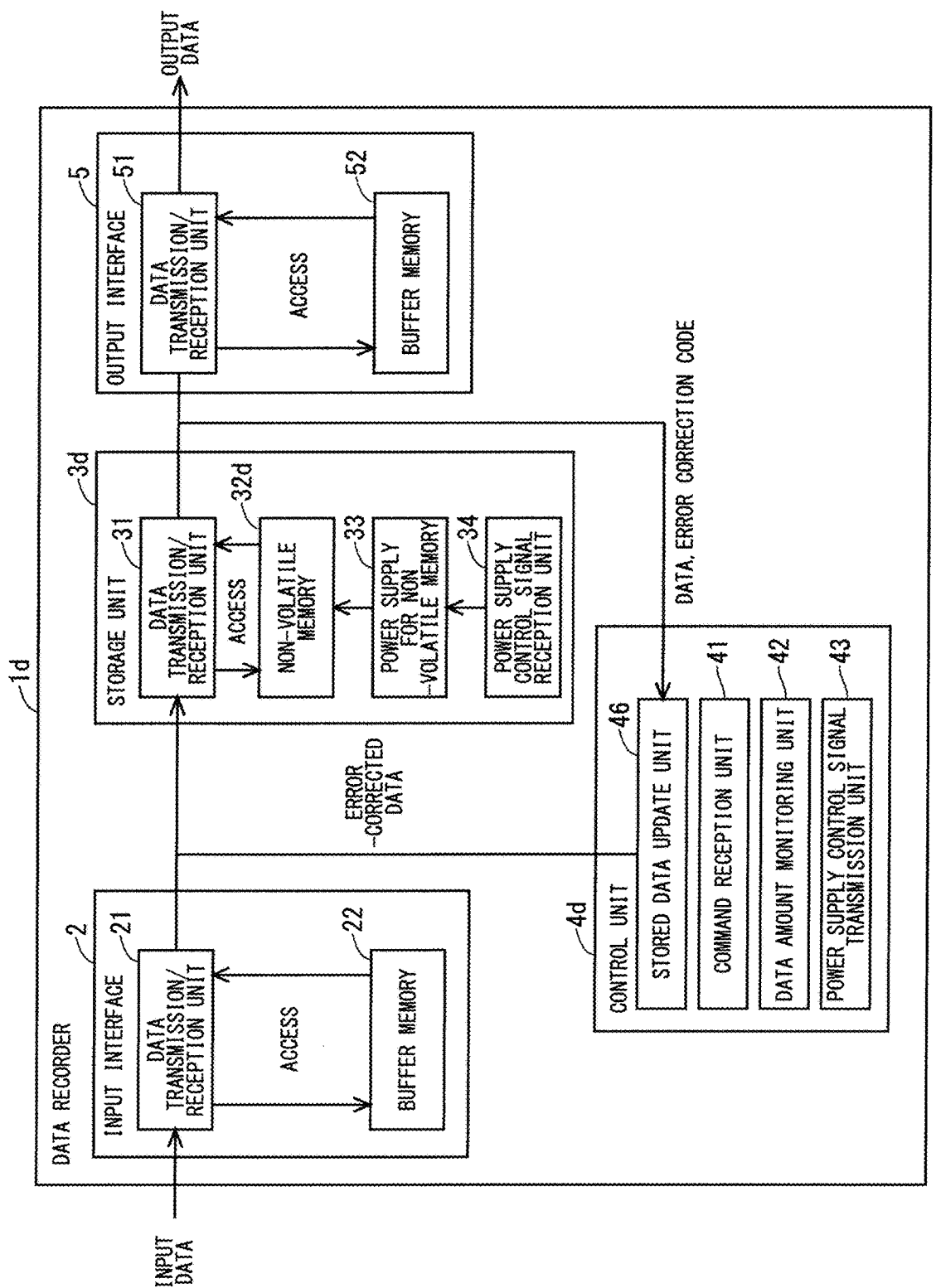
FIG. 11 is a block diagram illustrating a configuration of a data recorder according to a fourth embodiment.

FIG. 11 is a block diagram illustrating a configuration of the data recorder 1d. In FIG. 11, lines representing operation of the command reception unit 41, the data amount monitoring unit 42, and the power supply control signal transmission unit 43 are omitted for easy viewing.

The data recorder 1d is different from the data recorder 1 that is the data recorder according to the first embodiment in that the storage unit 3 is changed to a storage unit 3d and the control unit 4 is changed to a control unit 4d. In other respects, a configuration of the data recorder 1d is the same as that of the data recorder 1.

In the storage unit 3d, the non-volatile memory 32 is changed to a non-volatile memory 32d as compared with the storage unit 3. The storage unit 3d is the same as the storage unit 3 in other points.

When data is stored, the non-volatile memory 32d also stores an error correction code of the data. However, the error correction code may be stored in a memory other than the non-volatile memory 32. The error correction code may have any format as long as an error of the data stored in the non-volatile memory 32 can be corrected.

The control unit 4d further includes a stored data update unit 46 as compared with the control unit 4. The stored data update unit 46 performs stored data update processing which will be described in <D-2. Operation>. In other respects, a configuration of the control unit 4d is the same as that of the control unit 4.

Although it has been described that the control unit 4d further includes the stored data update unit 46 as compared with the control unit 4, the control unit 4d may further include the stored data update unit 46 as compared with the control unit 4b or the control unit 4c, and accordingly, the data recorder 1d may perform operation similar to <B-2. Operation> or <C-2. Operation> or both.

D-2. Operation

Similarly to the data recorder 1, the data recorder 1d performs the operation of <A-2. Operation>. However, in the description of <A-2. Operation>, the storage unit 3 is read as the storage unit 3d, the non-volatile memory 32 is read as the non-volatile memory 32d, and the control unit 4 is read as the control unit 4d.

Figure 12:
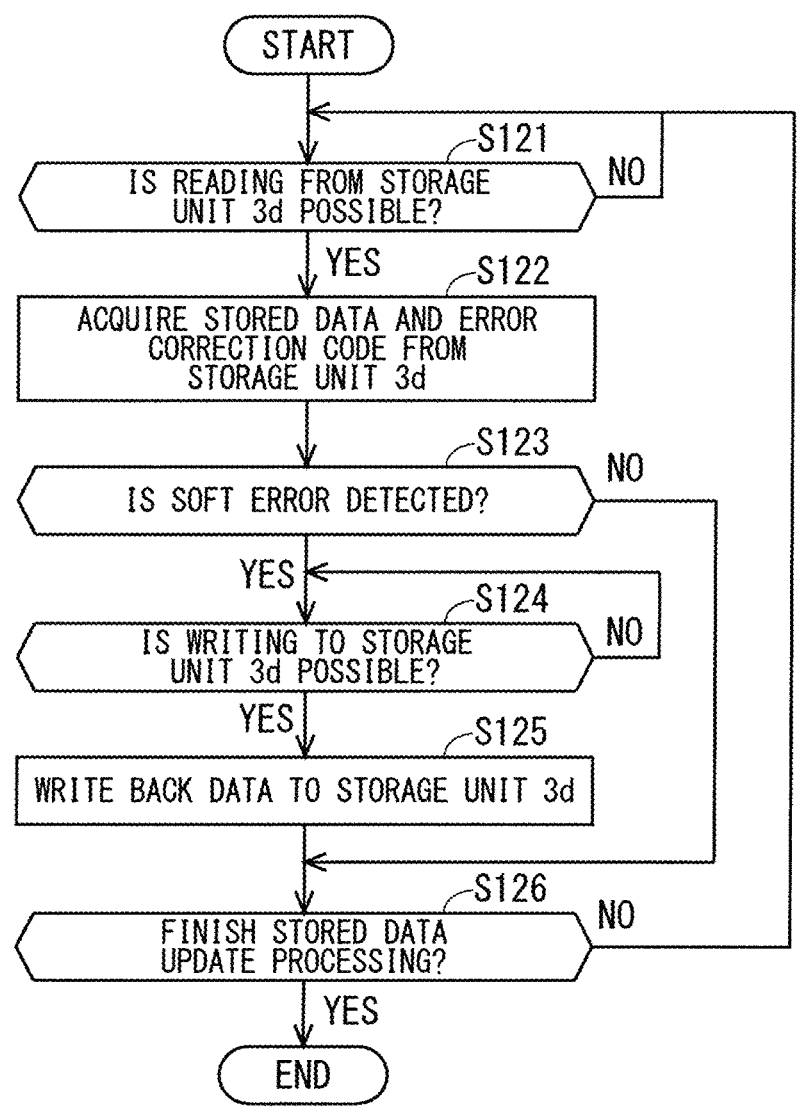
FIG. 12 is a flowchart of stored data update processing of the data recorder according to the fourth embodiment.

Hereinafter, outline of the operation of the stored data update unit 46 in the stored data update processing will be first described, and then the operation will be described in detail along the flowchart in FIG. 12.

The stored data update unit 46 determines whether there is a margin for reading data from the non-volatile memory 32 on the basis of an accessing condition of writing and reading to and from the non-volatile memory 32, and reads, from the non-volatile memory 32, stored data that is data stored in the non-volatile memory 32 when there is a margin for reading data from the non-volatile memory 32. In this event, an error correction code of the stored data is also acquired, and whether or not there is a soft error of the stored data is determined. In a case where no soft error is detected, it is not necessary to write back to the non-volatile memory 32. In a case where a soft error is detected, when there is a margin for writing data in the accessing condition of the non-volatile memory 32, data after the soft error is corrected is written back to the non-volatile memory 32.

As described above, by performing the stored data update processing, which is processing of reading the data stored in the non-volatile memory 32 from the non-volatile memory 32 and writing the data after a soft error is corrected back to the non-volatile memory 32 when the soft error has occurred, it is possible to prevent or reduce frequency of mixing of soft errors exceeding correction capability of the error correction code in the stored data of the non-volatile memory 32, and improve reliability of the data stored in the non-volatile memory 32.

Regarding the determination as to whether or not there is a margin for reading data or writing data, for example, it can be determined that there is a margin in a case where the power supply 33 for non-volatile memory is in an off state. However, it may be determined whether or not there is a margin for reading data or writing data by another method.

In addition, in order to allow the non-volatile memory 32 to have a margin for reading data or writing data, the data transfer speed between the buffer memory 22 or the buffer memory 52 and the non-volatile memory 32 may be lowered.

Operation procedure of the stored data update unit 46 in the data recorder 1d according to the fourth embodiment described above will be described with reference to a flowchart illustrated in FIG. 12. In the operation of the stored data update unit 46, the operation of the flowchart illustrated in FIG. 12 is started, for example, periodically or by a command from the user via the command reception unit 41.

The stored data update unit 46 first confirms whether there is a margin for reading from the non-volatile memory 32, that is, whether reading is possible (step S121). In a case where reading is not possible (step S121: No), the processing in step S121 is repeated, and confirmation work is continued until reading becomes possible.

In a case where the data can be read from the non-volatile memory 32 (step S121: Yes), the stored data update unit 46 reads the stored data of a predetermined size from the non-volatile memory 32 and acquires an error correction code of the read stored data (step S122). The predetermined size may be an arbitrarily set size. In step S122, in a case where the power supply 33 for non-volatile memory is not in an on state, the control unit 4e switches the state of the power supply 33 for non-volatile memory to an on state by the power supply control signal transmission unit 43, and then the stored data update unit 46 reads data from the non-volatile memory 32.

Next, the stored data update unit 46 determines whether or not there is a soft error on the basis of the read stored data and the acquired error correction code (step S123). As a result, if no soft error is detected (step S123: No), it is not necessary to write the data read in step S122 to the non-volatile memory 32 again, and thus, the processing proceeds to step S126.

If a soft error is detected in step S123 (step S123: Yes), the read data needs to be written again to the non-volatile memory 32 after soft error correction, and thus, the stored data update unit 46 confirms whether writing to the non-volatile memory 32 is possible (step S124).

If writing to the non-volatile memory 32 is not possible (step S124: No), the stored data update unit 46 repeats the processing in step S124 until writing becomes possible and continues confirmation work.

In a case where writing to the non-volatile memory 32 is possible (step S124: Yes), the stored data update unit 46 writes the data after the soft error is corrected back to the non-volatile memory 32 (step S125) and after the write-back is finished, the processing proceeds to step S126.

In step S126, the stored data update unit 46 determines whether to finish the stored data update processing. For example, if update processing for the data stored in the non-volatile memory 32 at the time of start of the stored data update processing is completed, the processing is finished, and otherwise, the processing returns to step S121. In step S126, in a case where the stored data update processing is finished, if the data reproduction or recording processing is not performed, the control unit 4e switches the state of the power supply 33 for non-volatile memory to an off state by the power supply control signal transmission unit 43, and then the stored data update processing is finished.

D-3. Effects

In the data recorder 1d, the stored data update unit 46 performs stored data update processing. This makes it possible to prevent or reduce frequency of accumulation of soft errors caused by upsets until the soft errors cannot be corrected by using the error correction code in an environment where upsets may occur due to the influence of radiation, or the like, and improve reliability of the data stored in the non-volatile memory 32.

E. Fifth Embodiment

In the data recorder 1d according to the fourth embodiment, for example, by periodically reading stored data, detecting an error, and writing back corrected data, it is prevented that an error cannot be corrected even if the error correction code is used. However, the frequency of occurrence of soft errors due to upsets, or the like, depends on the environment. It is therefore desirable that frequency of performing the stored data update processing of reading data, detecting an error, and writing back the error-corrected data can be dynamically changed.

The data recorder 1e, which is a data recorder according to the present embodiment, monitors occurrence frequency of soft errors and dynamically changes frequency of the stored data update processing, thereby preventing execution of unnecessary stored data update processing and preventing occurrence of errors that cannot be corrected due to an environmental change.

E-1. Configuration

Figure 13:
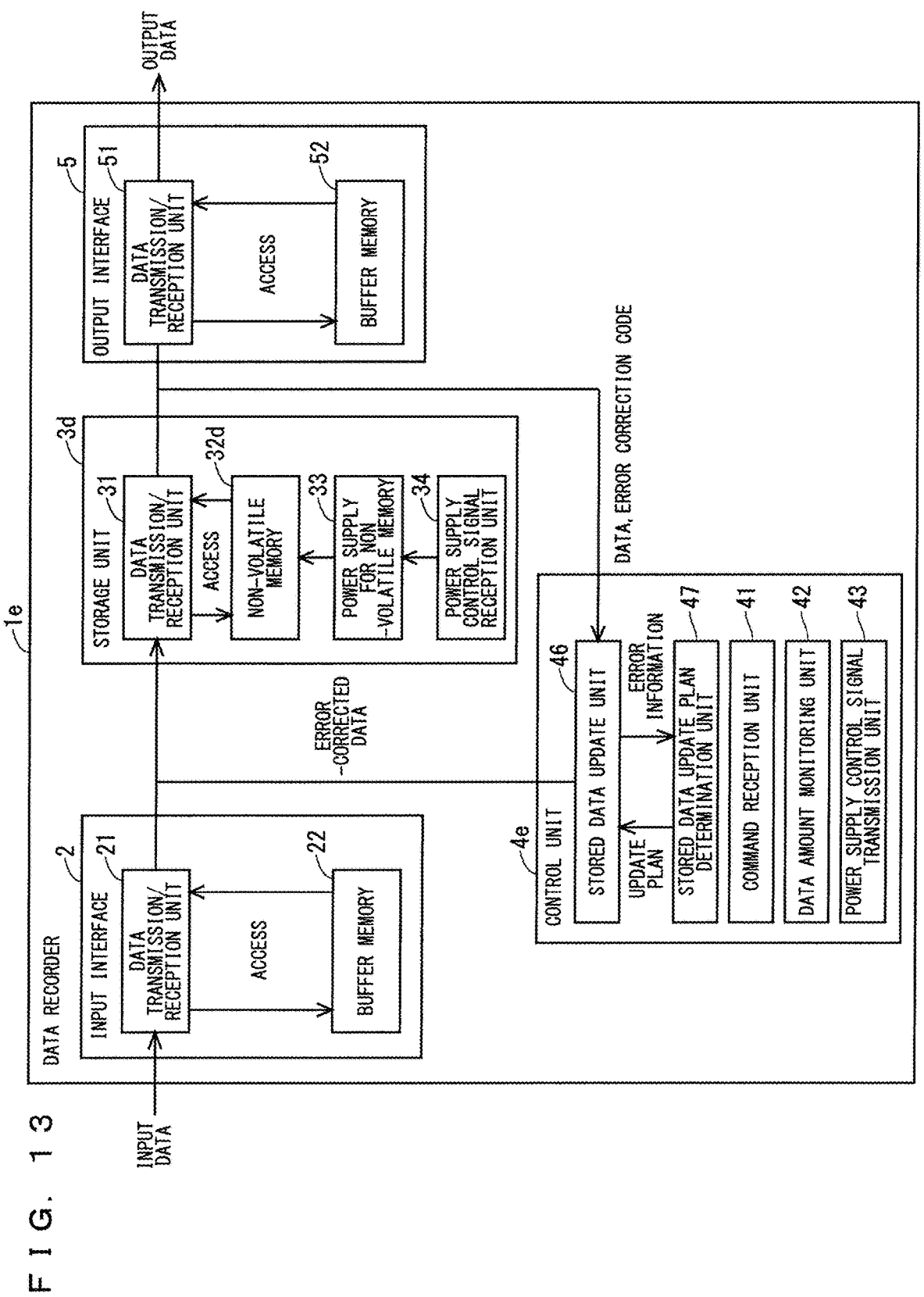
FIG. 13 is a block diagram illustrating a configuration of a data recorder according to a fifth embodiment.

FIG. 13 is a block diagram illustrating a configuration of the data recorder 1e. In FIG. 13, lines representing operation of the command reception unit 41, the data amount monitoring unit 42, and the power supply control signal transmission unit 43 are omitted for easy viewing.

Compared with the data recorder 1d according to the fourth embodiment, the data recorder 1e includes a control unit 4e instead of the control unit 4d. In other respects, a configuration of the data recorder 1e is similar to the configuration of the data recorder 1d.

The control unit 4e further includes a stored data update plan determination unit 47 as compared with the control unit 4d. Otherwise, a configuration of the control unit 4e is similar to the configuration of the control unit 4d.

E-2. Operation

The stored data update plan determination unit 47 acquires, from the stored data update unit 46, error information regarding an occurrence mode of soft errors obtained in the stored data update processing, for example, the number of detected errors or the number of errors per data amount. The stored data update plan determination unit 47 determines an update plan that is a plan of the stored data update processing on the basis of the occurrence mode of soft errors and instructs the stored data update unit 46 to perform the stored data update processing on the basis of the update plan.

Hereinafter, specifically, operation when the stored data update plan determination unit 47 determines an update plan will be described.

First, in an error correction code, how many errors can be corrected for a certain fixed amount of data is usually determined by a format of the error correction code. A maximum value of the number of errors correctable for the certain amount of data is set to $N_{emax}$.

The stored data update plan determination unit 47 specifically determines the plan of the stored data update processing through, for example, the following operation.

The stored data update plan determination unit 47 acquires the number of errors detected in the stored data update processing from the stored data update unit 46 and calculates an average value Nave of the number of errors occurred per the certain amount of data. The average value Nave is, for example, an average of one time of most recent stored data update processing or a plurality of times of stored data update processing.

For example, assuming that the number of errors occur per unit time does not change, the stored data update plan determination unit 47 decreases frequency of the stored data update processing as low as possible within a range in which a value of Nave expected in the next stored data update processing becomes a value equal to or less than a predetermined ratio with respect to $N_{emax}$. As a result, if the environment desirably changes more slowly than an interval of the stored data update processing, an expected value of the number of uncorrectable errors occurring every time the stored data update processing is performed can be desirably kept equal to or less than a certain value by increasing the frequency of the stored data update processing when a large number of soft errors occur, and unnecessary stored data update processing does not need to be performed when few soft errors occur. The predetermined ratio can be arbitrarily set as a design value, but may be specified by the user via the command reception unit 41.

In addition, instead of maintaining the number of uncorrectable errors occurring every time the stored data update processing is performed at equal to or less than a certain value, the frequency of the stored data update processing may be determined so that the expected value of the number of uncorrectable errors occurring per unit time is maintained at equal to or less than a certain value.

If the interval of the stored data update processing is set too long, there is a possibility that the environment greatly changes while the stored data update processing is not performed, and thus, for example, the stored data update plan determination unit 47 may set a maximum value of the time interval between the stored data update processing.

If the interval until the next stored data update processing is short, the period during which the power supply 33 for non-volatile memory is in an on state increases due to the stored data update processing, and thus, for example, a minimum value of the time interval between the stored data update processing may be set.

E-3. Effects

In the data recorder 1e, the stored data update plan determination unit 47 determines the plan of the stored data update processing on the basis of the occurrence mode of the soft error detected in the stored data update processing. This can reduce the period during which the power supply 33 for non-volatile memory is in an on state and, for example, can suppress occurrence of latch-ups while improving reliability of the data stored in the non-volatile memory 32.

F. Sixth Embodiment

In the present embodiment, a hardware configuration of the data recorder 1 to the data recorder 1e described in the first to fifth embodiments will be described.

Figure 14:
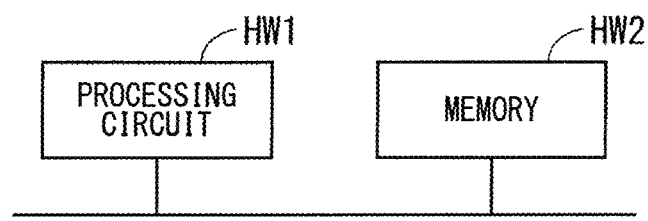
FIG. 14 is a view illustrating a hardware configuration of part of the data recorder according to the first to fifth embodiments.

FIG. 14 is a view illustrating a hardware configuration of the data transmission/reception unit 21, the data transmission/reception unit 31, the data transmission/reception unit 51, the power supply control signal reception unit 34, and the control units 4, 4b, 4c, 4d, and 4e. In FIG. 14, the buffer memories 22 and 52, the non-volatile memory 32, the power supply 33 for non-volatile memory, and the like, are not illustrated.

The functions of the data transmission/reception unit 21, the data transmission/reception unit 31, the data transmission/reception unit 51, the power supply control signal reception unit 34, and the control units 4, 4b, 4c, 4d, and 4e are implemented by a processing circuit HW1. In particular, each function of the command reception unit 41, the data amount monitoring unit 42, the power supply control signal transmission unit 43, the threshold control unit 44, the current value monitoring unit 45, the stored data update unit 46, and the stored data update plan determination unit 47 included in at least one of the control units 4, 4b, 4c, 4d, or 4e is implemented by the processing circuit HW1.

The processing circuit HW1 may be dedicated hardware or a central processing unit (CPU) that executes a program stored in a memory HW2. In a case where the processing circuit HW1 is dedicated hardware, the processing circuit HW1 corresponds to, for example, a single circuit, a composite circuit, a programmed processor, a parallel programmed processor, an application specific integrated circuit (ASIC), a field-programmable gate array (FPGA), or a combination thereof.

In a case where the processing circuit HW1 is a CPU, the functions of the data transmission/reception unit 21, the data transmission/reception unit 31, the data transmission/reception unit 51, the power supply control signal reception unit 34, and the control units 4, 4b, 4c, 4d, and 4e are implemented by software, firmware, or a combination of software and firmware. Software and firmware are described as programs and stored in the memory HW2. The processing circuit HW1 reads and executes the program stored in the memory HW2 to implement the functions of the data transmission/reception unit 21, the data transmission/reception unit 31, the data transmission/reception unit 51, the power supply control signal reception unit 34, and the control units 4, 4b, 4c, 4d, and 4e.

Part of the functions of the data transmission/reception unit 21, the data transmission/reception unit 31, the data transmission/reception unit 51, the power supply control signal reception unit 34, and the control units 4, 4b, 4c, 4d, and 4e may be implemented by dedicated hardware, and the rest may be implemented by software or firmware.

The memory HW2 is, for example, any one of a non-volatile semiconductor memory such as a flash memory, an MRAM and an EEPROM, a magnetic disk, a flexible disk, an optical disk, a compact disk, a mini disk, a DVD, or the like, or a combination thereof. The memory HW2 is, for example, a memory different from the buffer memory 22, the buffer memory 52, and the non-volatile memory 32, but the memory HW2 may be the buffer memory 22 or the non-volatile memory 32.

G. Seventh Embodiment

G-1. Data Recorder 100

FIG. 15 illustrates a data recorder 100 according to the present embodiment.

The data recorder 100 includes an input interface 200, a storage unit 300, and a control unit 4000.

The storage unit 300 includes the non-volatile memory 32 that stores data and the power supply 33 for non-volatile memory that is a power supply for the non-volatile memory 32, the state of the power supply 33 for non-volatile memory being controlled to be an on state or an off state by the control unit 4000.

The input interface 200 includes the buffer memory 22 which is a first buffer memory. The input interface 200 accepts input of data from outside and records the data in the buffer memory 22.

The control unit 4000 switches the state of the power supply 33 for non-volatile memory to an on state at a timing determined on the basis of the amount of data recorded in the buffer memory 22 and a mode of input of data from outside via the input interface 200, the input interface 200 transfers the data recorded in the buffer memory 22 to the non-volatile memory 32 in a case where the power supply 33 for non-volatile memory is in an on state, and the control unit 4000 switches the state of the power supply 33 for non-volatile memory to an off state after transferring the data recorded in the buffer memory 22 to the non-volatile memory 32. The data recorder 100 can thus reduce adverse effects caused by radiation.

G-2. Data Recorder 101

Figure 16:
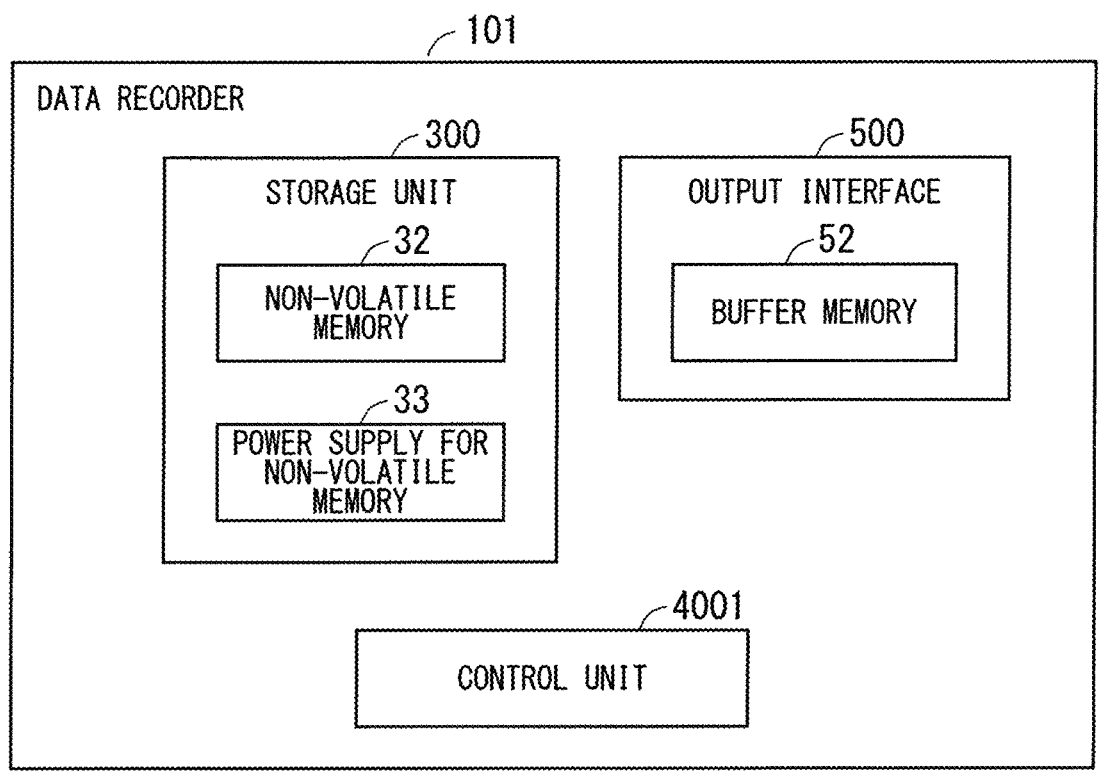
FIG. 16 is a block diagram illustrating a configuration of one aspect of the data recorder according to the sixth embodiment.

FIG. 16 illustrates a data recorder 101 according to the present embodiment.

The data recorder 101 includes an output interface 500, a storage unit 300, and a control unit 4001.

The storage unit 300 includes the non-volatile memory 32 that stores data and the power supply 33 for non-volatile memory that is a power supply for the non-volatile memory 32, the state of the power supply 33 for non-volatile memory being controlled to be an on state or an off state by the control unit 4001.

The output interface 500 includes the buffer memory 52 which is a second buffer memory.

When data to be output, stored in the non-volatile memory 32 is output to outside via the buffer memory 52, the control unit 4001 switches the state of the power supply 33 for non-volatile memory to an off state in part of a period from start of transfer of the data to be output to the buffer memory 52 to end of transfer of the data to be output to the buffer memory 52. The data recorder 101 can thus reduce adverse effects caused by radiation.

G-3. Data Recorder 102

Figure 17:
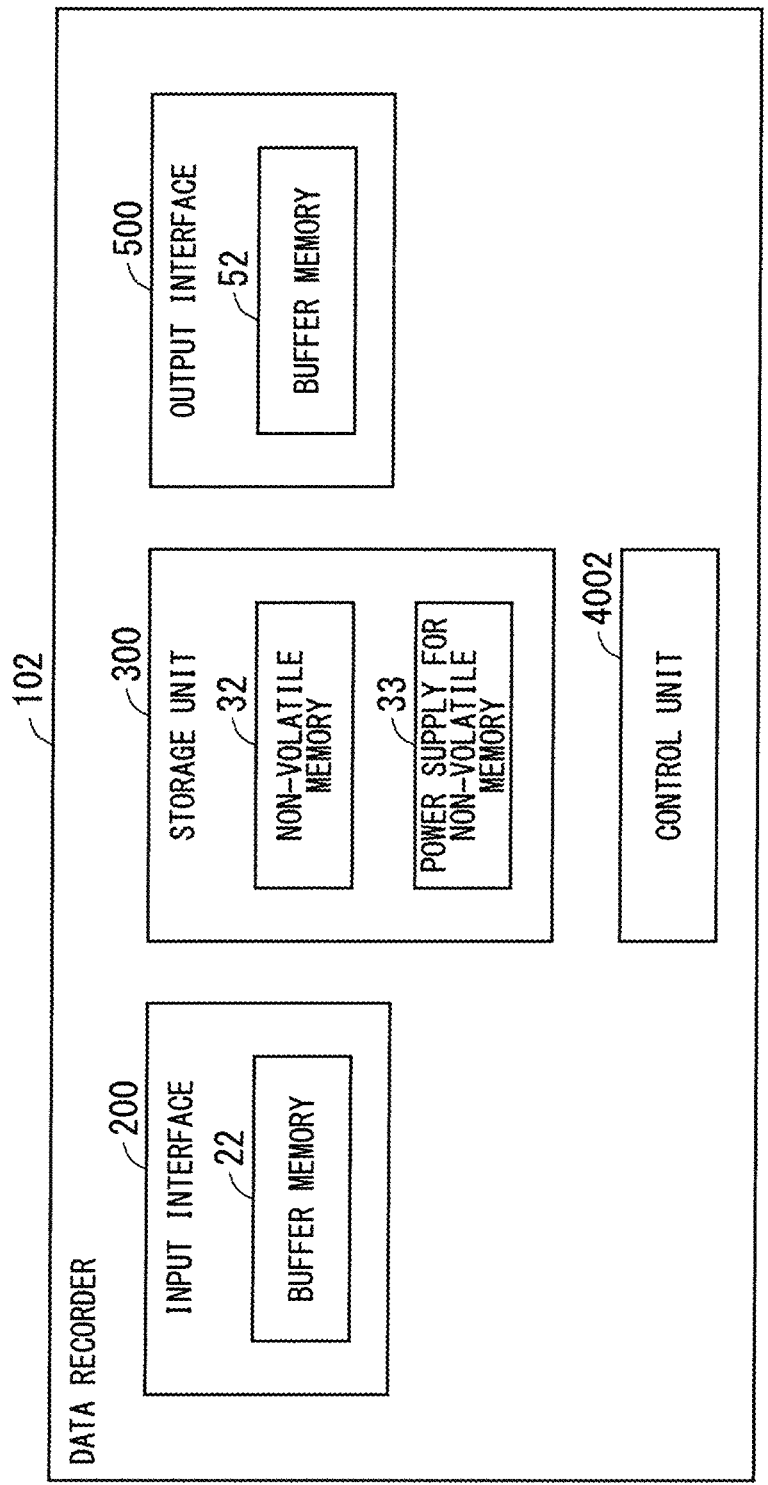
FIG. 17 is a block diagram illustrating a configuration of one aspect of the data recorder according to the sixth embodiment.

FIG. 17 illustrates a data recorder 102 according to the present embodiment.

The data recorder 102 includes an input interface 200, an output interface 500, a storage unit 300, and a control unit 4002.

The storage unit 300 includes the non-volatile memory 32 that stores data and the power supply 33 for non-volatile memory that is a power supply for the non-volatile memory 32, a state of the power supply 33 for non-volatile memory being controlled to be an on state or an off state by the control unit 4002.

The input interface 200 includes the buffer memory 22 which is a first buffer memory.

The output interface 500 includes the buffer memory 52 which is a second buffer memory.

The input interface 200 accepts input of data from outside and records the data in the buffer memory 22.

The control unit 4002 switches the state of the power supply 33 for non-volatile memory to an on state at a timing determined on the basis of the amount of data recorded in the buffer memory 22 and a mode of input of data from outside via the input interface 200, the input interface 200 transfers the data recorded in the buffer memory 22 to the non-volatile memory 32 in a case where the power supply 33 for non-volatile memory is in an on state, and the control unit 4002 switches the state of the power supply 33 for non-volatile memory to an off state after transferring the data recorded in the buffer memory 22 to the non-volatile memory 32. The data recorder 102 can thus reduce adverse effects caused by radiation.

When data to be output, stored in the non-volatile memory 32 is output to outside via the buffer memory 52, the control unit 4002 switches the state of the power supply 33 for non-volatile memory to an off state in part of a period from start of transfer of the data to be output to the buffer memory 52 to end of transfer of the data to be output to the buffer memory 52. The data recorder 102 can thus reduce adverse effects caused by radiation.

H. Eighth Embodiment

In the present embodiment, methods for using the data recorder 1, the data recorder 1b, the data recorder 1c, the data recorder 1d, the data recorder 1e, the data recorder 100, the data recorder 101, and the data recorder 102 described in the first to seventh embodiments will be described.

Each of the data recorder 1, the data recorder 1b, the data recorder 1c, the data recorder 1d, the data recorder 1e, the data recorder 100, the data recorder 101, and the data recorder 102 described in the first to seventh embodiments is a data recorder having enhanced radiation resistance by providing a period in which the state of the power supply 33 for non-volatile memory is switched to an off state.

The data recorder 1, the data recorder 1b, the data recorder 1c, the data recorder 1d, the data recorder 1e, the data recorder 100, the data recorder 101, and the data recorder 102 are less likely to cause problems even if used in a radiation environment because adverse effects caused by radiation are reduced. The radiation environment refers to an environment in which a radiation dose is sufficiently higher than that in a natural environment on the ground, and is, for example, an environment with a radiation dose equivalent to equal to or more than 50 millisieverts per year, and the radiation environment is implemented in space, for example. Also on the ground, for example, in a nuclear power plant, the radiation environment can be implemented.

In the method for using the data recorder according to the present embodiment, any data recorder among the data recorder 1, the data recorder 1b, the data recorder 1c, the data recorder 1d, the data recorder 1e, the data recorder 100, the data recorder 101, and the data recorder 102 is used, the data recorder is disposed in the radiation environment, and data is recorded in the data recorder or data recorded in the data recorder is reproduced. This enables data to be stably recorded or reproduced in a radiation environment. For example, in an observation satellite, a recording request for a data recorder always occurs in a radiation environment, also in which case, it is possible to reduce adverse effects caused by radiation and stably record data by using any one of the data recorder 1 (except the configuration of <A-4. First modification>), the data recorder 1b, the data recorder 1c, the data recorder 1d, the data recorder 1e, the data recorder 100, and the data recorder 102.

Note that the embodiments can be freely combined, and the embodiments can be appropriately modified or omitted.

EXPLANATION OF REFERENCE SIGNS 1, 1b, 1c, 1d, 1e, 100, 101, 102: data recorder
2, 200: input interface
3, 3d, 300: storage unit
4, 4b, 4c, 4d, 4e, 4000, 4001, 4002: control unit
5, 500: output interface
21, 31, 51: data transmission/reception unit
22, 52: buffer memory
32, 32d: non-volatile memory
33: power supply for non-volatile memory
34: power supply control signal reception unit
41: command reception unit
42: data amount monitoring unit
43: power supply control signal transmission unit
44: threshold control unit
45: current value monitoring unit
46: stored data update unit
47: stored data update plan determination unit
60: current threshold
300: storage unit
400, 401: threshold
HW1: processing circuit
HW2: memory

The invention claimed is:

1. A data recorder comprising:
an input interface;
a storage unit; and
a control circuit,
wherein the storage unit comprises a non-volatile memory configured to store data and a power supply for the non-volatile memory, a state of the power supply for the non-volatile memory being controlled to be an on state or an off state by the control circuit,
the input interface comprises a first buffer memory,
the input interface accepts input of data from outside and records the data in the first buffer memory,
the control circuit switches the state of the power supply for the non-volatile memory to the on state at a timing determined on a basis of an amount of data recorded in the first buffer memory and a mode of the input of the data from the outside via the input interface,
the input interface transfers the data recorded in the first buffer memory to the non-volatile memory in a case where the power supply for the non-volatile memory is in the on state, and
the control circuit switches the state of the power supply for the non-volatile memory to the off state after transferring the data recorded in the first buffer memory to the non-volatile memory.

2. The data recorder according to claim 1,
wherein the control circuit switches the state of the power supply for the non-volatile memory to the on state in a case where the amount of the data recorded in the first buffer memory exceeds a first threshold determined on a basis of the mode of the input of the data from the outside via the input interface, on a basis of the amount of the data recorded in the first buffer memory and the mode of the input of the data from the outside via the input interface.

3. The data recorder according to claim 2,
wherein the mode of the input of the data from the outside via the input interface is speed of the input of the data from the outside via the input interface.

4. The data recorder according to claim 1,
wherein the control circuit switches the state of the power supply for the non-volatile memory to the off state only at a timing at which writing to the non-volatile memory and reading from the non-volatile memory are not performed.

5. The data recorder according to claim 1,
wherein the control circuit further comprises a current value monitoring circuit configured to monitor a current value of the power supply for the non-volatile memory, and
the control circuit switches the state of the power supply for the non-volatile memory to the off state at a timing determined by the current value monitoring circuit on a basis of the current value of the power supply for the non-volatile memory.

6. The data recorder according to claim 5,
wherein the control circuit switches the state of the power supply for the non-volatile memory to the off state in a case where the current value exceeds a predetermined third threshold.

7. The data recorder according to claim 1,
wherein the control circuit further comprises a stored data update circuit configured to perform stored data update processing, and
the stored data update processing is processing of reading data stored in the non-volatile memory from the non-volatile memory and, in a case where a soft error occurs, writing data after soft error is corrected, back to the non-volatile memory.

8. The data recorder according to claim 7,
wherein the control circuit further comprises a stored data update plan determination circuit, and
the stored data update plan determination circuit determines a plan of the stored data update processing on a basis of an occurrence mode of the soft error detected in the stored data update processing and instructs the stored data update circuit to execute the plan of the stored data update processing.

9. The data recorder according to claim 1,
wherein radiation resistance is improved by providing a period during which the power supply for the non-volatile memory is in the off state.

10. The data recorder according to claim 1,
wherein the data recorder is used in a radiation environment.

11. A method for using a data recorder that is a method for using the data recorder according to claim 1, the method comprising:
disposing the data recorder in a radiation environment to record data in the data recorder or reproduce data recorded in the data recorder.

12. A data recorder comprising:
an output interface;
a storage unit; and
a control circuit,
wherein the storage unit comprises a non-volatile memory configured to store data and a power supply for the non-volatile memory, a state of the power supply for the non-volatile memory being controlled to be an on state or an off state by the control circuit,
the output interface comprises a second buffer memory, and
when data to be output, stored in the non-volatile memory is output to outside via the second buffer memory, the control circuit switches the state of the power supply for the non-volatile memory to the off state in part of a period from start of transfer of the data to be output to the second buffer memory to end of transfer of the data to be output to the second buffer memory.

13. The data recorder according to claim 12,
wherein when the state of the power supply for the non-volatile memory is switched to the on state at the end of the part of the period during which the power supply for the non-volatile memory is in the off state, the control circuit switches the state of the power supply for the non-volatile memory to the on state at a timing determined on a basis of an amount of data recorded in the second buffer memory.

14. The data recorder according to claim 13,
wherein when the state of the power supply for the non-volatile memory is switched to the on state at the end of the part of the period during which the power supply for the non-volatile memory is in the off state, the control circuit switches the state of the power supply for the non-volatile memory to the on state at a timing determined on a basis of the amount of the data recorded in the second buffer memory and a mode of output of data to outside via the output interface.

15. The data recorder according to claim 14,
wherein when the state of the power supply for the non-volatile memory is switched to the on state at the end of the part of the period during which the power supply for the non-volatile memory is in the off state, the control circuit switches the state of the power supply for the non-volatile memory to the on state in a case where the amount of the data recorded in the second buffer memory exceeds a second threshold determined on a basis of the mode of the output of the data to the outside via the output interface, on a basis of the amount of the data recorded in the second buffer memory and the mode of the output of the data to the outside via the output interface.

16. The data recorder according to claim 14,
wherein the mode of the output of the data to the outside via the output interface is speed of the output of the data to the outside via the output interface.

17. The data recorder according to claim 12,
wherein the control circuit switches the state of the power supply for the non-volatile memory to the off state only at a timing at which writing to the non-volatile memory and reading from the non-volatile memory are not performed.

18. The data recorder according to claim 12,
wherein the control circuit further comprises a current value monitoring circuit configured to monitor a current value of the power supply for the non-volatile memory, and
the control circuit switches the state of the power supply for the non-volatile memory to the off state at a timing determined by the current value monitoring circuit on a basis of the current value of the power supply for the non-volatile memory.

19. The data recorder according to claim 18,
wherein the control circuit switches the state of the power supply for the non-volatile memory to the off state in a case where the current value exceeds a predetermined third threshold.

20. The data recorder according to claim 12,
wherein the control circuit further comprises a stored data update circuit configured to perform stored data update processing, and
the stored data update processing is processing of reading data stored in the non-volatile memory from the non-volatile memory and, in a case where a soft error occurs, writing data after soft error is corrected, back to the non-volatile memory.

21. The data recorder according to claim 20,
wherein the control circuit further comprises a stored data update plan determination circuit, and
the stored data update plan determination circuit determines a plan of the stored data update processing on a basis of an occurrence mode of the soft error detected in the stored data update processing and instructs the stored data update circuit to execute the plan of the stored data update processing.

22. The data recorder according to claim 12,
wherein radiation resistance is improved by providing a period during which the power supply for the non-volatile memory is in the off state.

23. The data recorder according to claim 12,
wherein the data recorder is used in a radiation environment.

24. A method for using a data recorder that is a method for using the data recorder according to claim 12, the method comprising:
disposing the data recorder in a radiation environment to record data in the data recorder or reproduce data recorded in the data recorder.

25. A data recorder comprising:
an input interface;
an output interface;
a storage unit; and
a control circuit,
wherein the storage unit comprises a non-volatile memory configured to store data and a power supply for the non-volatile memory, a state of the power supply for the non-volatile memory being controlled to be an on state or an off state by the control circuit,
the input interface comprises a first buffer memory,
the output interface comprises a second buffer memory,
the input interface accepts input of data from outside and records the data in the first buffer memory,
the control circuit switches the state of the power supply for the non-volatile memory to the on state at a timing determined on a basis of an amount of data recorded in the first buffer memory and a mode of the input of the data from the outside via the input interface,
the input interface transfers the data recorded in the first buffer memory to the non-volatile memory in a case where the power supply for the non-volatile memory is in the on state,
the control circuit switches the state of the power supply for the non-volatile memory to the off state after transferring the data recorded in the first buffer memory to the non-volatile memory, and
when data to be output, stored in the non-volatile memory is output to outside via the second buffer memory, the control circuit switches the state of the power supply for the non-volatile memory to the off state in part of a period from start of transfer of the data to be output to the second buffer memory to end of transfer of the data to be output to the second buffer memory.

26. The data recorder according to claim 25,
wherein the control circuit switches the state of the power supply for the non-volatile memory to the on state in a case where the amount of the data recorded in the first buffer memory exceeds a first threshold determined on a basis of the mode of the input of the data from the outside via the input interface, on a basis of the amount of the data recorded in the first buffer memory and the mode of the input of the data from the outside via the input interface.

27. The data recorder according to claim 26,
wherein the mode of the input of the data from the outside via the input interface is speed of the input of the data from the outside via the input interface.

28. The data recorder according to claim 25,
wherein when the state of the power supply for the non-volatile memory is switched to the on state at the end of the part of the period during which the power supply for the non-volatile memory is in the off state, the control circuit switches the state of the power supply for the non-volatile memory to the on state at a timing determined on a basis of an amount of data recorded in the second buffer memory.

29. The data recorder according to claim 28,
wherein when the state of the power supply for the non-volatile memory is switched to the on state at the end of the part of the period during which the power supply for the non-volatile memory is in the off state, the control circuit switches the state of the power supply for the non-volatile memory to the on state at a timing determined on a basis of the amount of the data recorded in the second buffer memory and a mode of output of data to outside via the output interface.

30. The data recorder according to claim 29,
wherein when the state of the power supply for the non-volatile memory is switched to the on state at the end of the part of the period during which the power supply for the non-volatile memory is in the off state, the control circuit switches the state of the power supply for the non-volatile memory to the on state in a case where the amount of the data recorded in the second buffer memory exceeds a second threshold determined on a basis of the mode of the output of the data to the outside via the output interface, on a basis of the amount of the data recorded in the second buffer memory and the mode of the output of the data to the outside via the output interface.

31. The data recorder according to claim 29,
wherein the mode of the output of the data to the outside via the output interface is speed of the output of the data to the outside via the output interface.

32. The data recorder according to claim 25,
wherein the control circuit switches the state of the power supply for the non-volatile memory to the off state only at a timing at which writing to the non-volatile memory and reading from the non-volatile memory are not performed.

33. The data recorder according to claim 25,
wherein the control circuit further comprises a current value monitoring circuit configured to monitor a current value of the power supply for the non-volatile memory, and
the control circuit switches the state of the power supply for the non-volatile memory to the off state at a timing determined by the current value monitoring circuit on a basis of the current value of the power supply for the non-volatile memory.

34. The data recorder according to claim 33,
wherein the control circuit switches the state of the power supply for the non-volatile memory to the off state in a case where the current value exceeds a predetermined third threshold.

35. The data recorder according to claim 25,
wherein the control circuit further comprises a stored data update circuit configured to perform stored data update processing, and the stored data update processing is processing of reading data stored in the non-volatile memory from the non-volatile memory and, in a case where a soft error occurs, writing data after soft error is corrected, back to the non-volatile memory.

36. The data recorder according to claim 35,
wherein the control circuit further comprises a stored data update plan determination circuit, and
the stored data update plan determination circuit determines a plan of the stored data update processing on a basis of an occurrence mode of the soft error detected in the stored data update processing and instructs the stored data update circuit to execute the plan of the stored data update processing.

37. The data recorder according to claim 25,
wherein radiation resistance is improved by providing a period during which the power supply for the non-volatile memory is in the off state.

38. The data recorder according to claim 25,
wherein the data recorder is used in a radiation environment.

39. A method for using a data recorder that is a method for using the data recorder according to claim 25, the method comprising:
disposing the data recorder in a radiation environment to record data in the data recorder or reproduce data recorded in the data recorder.

* * * * *